United States Patent
Kulkarni et al.

(10) Patent No.: US 10,714,145 B2
(45) Date of Patent: * Jul. 14, 2020

(54) SYSTEMS AND METHODS TO ASSOCIATE MULTIMEDIA TAGS WITH USER COMMENTS AND GENERATE USER MODIFIABLE SNIPPETS AROUND A TAG TIME FOR EFFICIENT STORAGE AND SHARING OF TAGGED ITEMS

(71) Applicant: Gracenote, Inc., Emeryville, CA (US)

(72) Inventors: Sunil Suresh Kulkarni, Santa Cruz, CA (US); Oleksiy Bolgarov, San Jose, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,015

(22) Filed: Apr. 16, 2019

(65) Prior Publication Data
US 2019/0348078 A1 Nov. 14, 2019

Related U.S. Application Data

(63) Continuation of application No. 15/973,118, filed on May 7, 2018, now Pat. No. 10,297,286, which is a (Continued)

(51) Int. Cl.
*G11B 27/10* (2006.01)
*H04N 9/80* (2006.01)
(Continued)

(52) U.S. Cl.
CPC ........... *G11B 27/10* (2013.01); *G11B 27/031* (2013.01); *H04N 21/23418* (2013.01);
(Continued)

(58) Field of Classification Search
None
See application file for complete search history.

(56) References Cited

U.S. PATENT DOCUMENTS

2009/0087161 A1   4/2009  Roberts et al.
2009/0327100 A1  12/2009  Greenberg et al.
(Continued)

*Primary Examiner* — Heather R Jones
(74) *Attorney, Agent, or Firm* — McDonnell Boehnen Hulbert & Berghoff LLP

(57) ABSTRACT

Example methods and apparatus to add a tagged snippet of multimedia content to a playlist are disclosed. An example apparatus comprises an automatic content recognition search service to search a fingerprint database to find a match between query fingerprints for a snippet of multimedia content captured from a multimedia program at a timestamp and reference fingerprints of matching reference multimedia content stored in the fingerprint database, a tag service to generate a tag representing the snippet of multimedia content, wherein the tag, the timestamp, meta information associated with the matching reference multimedia content, and a monitored variable for a number of viewers of the snippet of multimedia content are stored in a database storage as a tagged snippet of multimedia content, and to add the tagged snippet of multimedia content to a playlist for an identified multimedia program if the number of viewers of the tagged snippet exceeds a threshold.

20 Claims, 18 Drawing Sheets

Related U.S. Application Data continuation of application No. 14/255,742, filed on Apr. 17, 2014, now Pat. No. 9,966,112.

(60) Provisional application No. 61/813,305, filed on Apr. 18, 2013.

(51) Int. Cl.
| | |
|---|---|
| *G11B 27/031* | (2006.01) |
| *H04N 21/262* | (2011.01) |
| *H04N 21/458* | (2011.01) |
| *H04N 21/234* | (2011.01) |
| *H04N 21/44* | (2011.01) |
| *H04N 21/4788* | (2011.01) |

(52) U.S. Cl.
CPC . *H04N 21/26258* (2013.01); *H04N 21/44008* (2013.01); *H04N 21/458* (2013.01); *H04N 21/4788* (2013.01)

(56) References Cited

U.S. PATENT DOCUMENTS

| | | | |
|---|---|---|---|
| 2010/0318515 A1* | 12/2010 | Ramanathan | G06K 9/00744 707/723 |
| 2012/0155834 A1* | 6/2012 | Beacham | H04N 21/4334 386/241 |
| 2013/0132842 A1* | 5/2013 | Kashyap | G06F 3/0481 715/719 |
| 2015/0185965 A1 | 7/2015 | Belliveau et al. | |

* cited by examiner

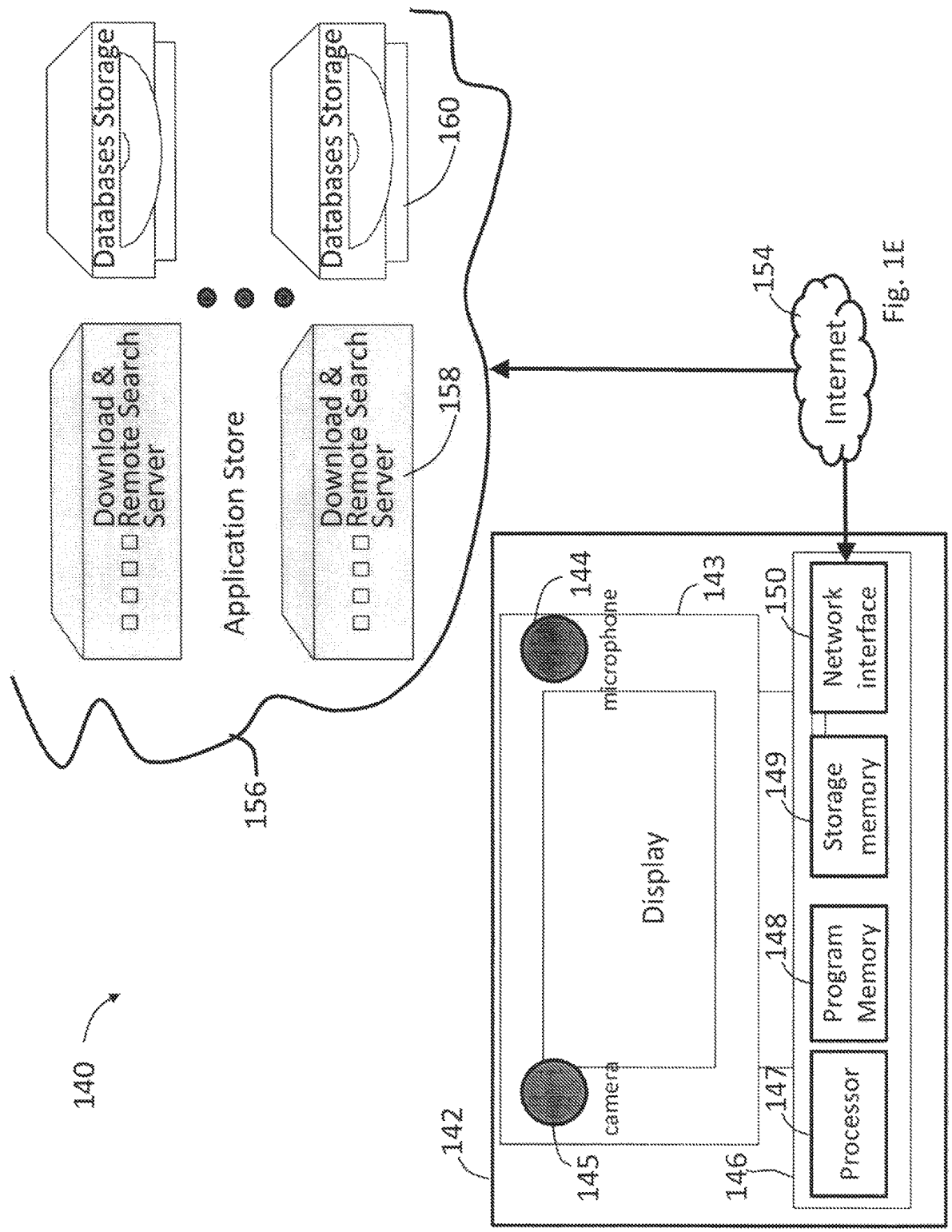

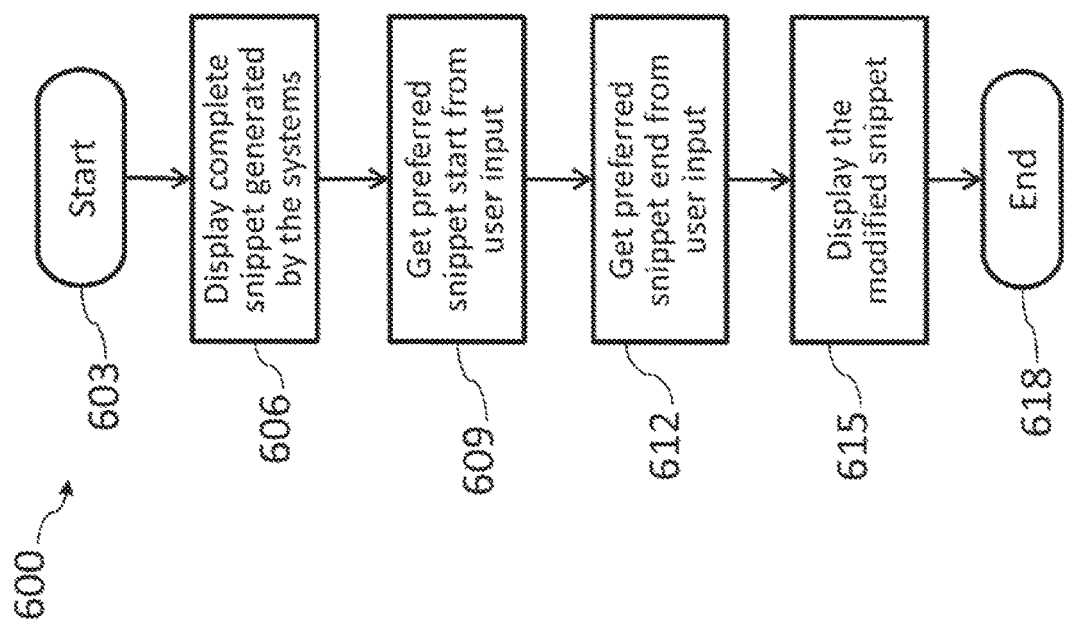

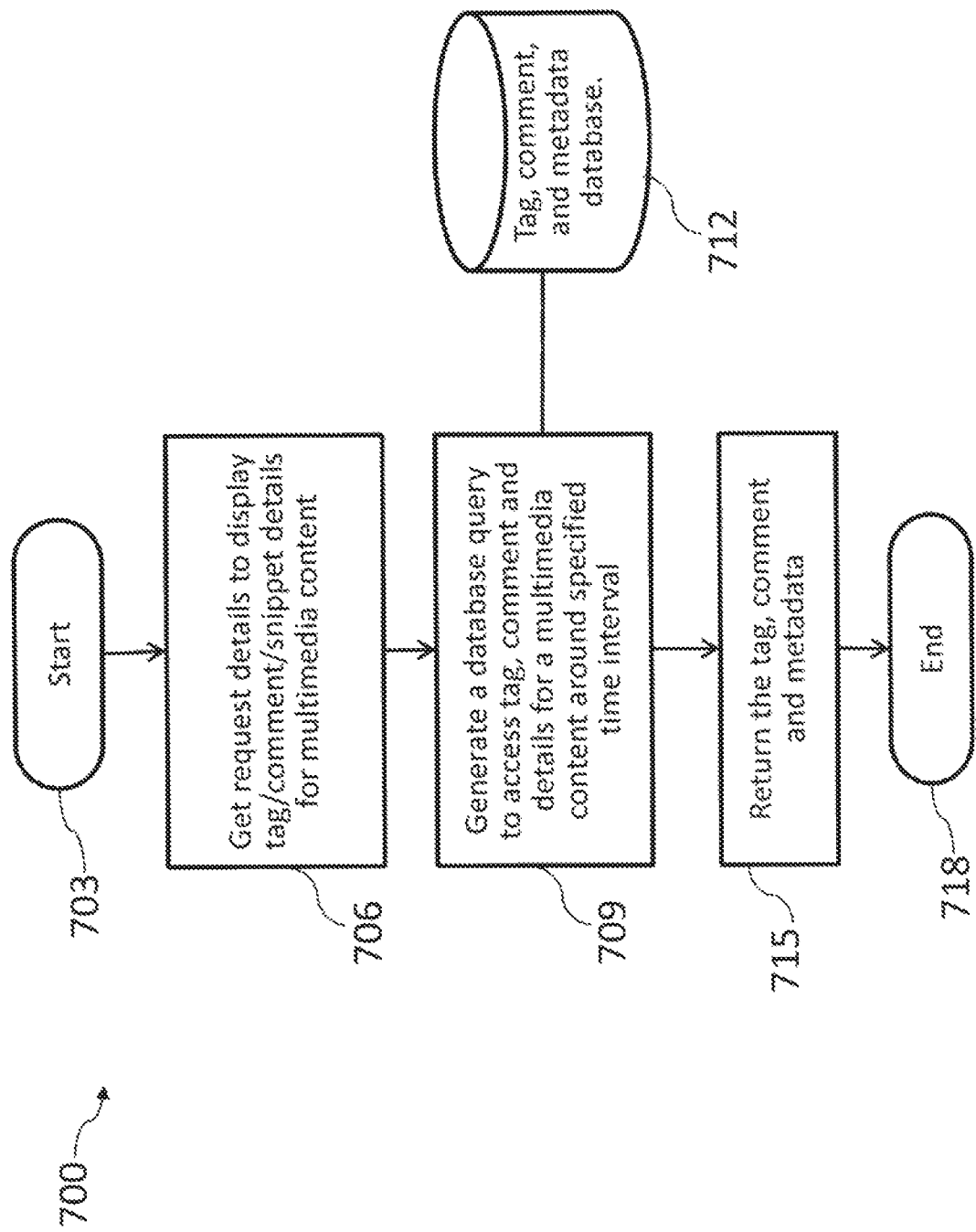

SYSTEMS AND METHODS TO ASSOCIATE MULTIMEDIA TAGS WITH USER COMMENTS AND GENERATE USER MODIFIABLE SNIPPETS AROUND A TAG TIME FOR EFFICIENT STORAGE AND SHARING OF TAGGED ITEMS

RELATED APPLICATION

The present application is a continuation of U.S. patent application Ser. No. 15/973,118, filed on May 7, 2018, which is a continuation of U.S. patent application Ser. No. 14/255,742, filed on Apr. 17, 2014, which claims the benefit of U.S. Provisional Patent Application No. 61/813,305, filed on Apr. 18, 2013. U.S. patent application Ser. No. 14/255,742 and U.S. Provisional Patent Application No. 61/813,305 are hereby incorporated herein by reference in their entirety.

U.S. patent application Ser. No. 12/141,163 filed Jun. 18, 2008 entitled "Methods and Apparatus for Providing a Scalable Identification of Digital Video Sequences", U.S. patent application Ser. No. 12/141,337 filed on Jun. 18, 2008, "Methods and Apparatus for Multi-Dimensional Content Search and Video Identification", U.S. patent application Ser. No. 12/491,896 filed Jun. 25, 2009 entitled "Digital Video Fingerprinting Based on Resultant Weighted Gradient Orientation Computation", U.S. patent application Ser. No. 12/612,729 filed Nov. 5, 2009 entitled "Digital Video Content Fingerprinting Based on Scale Invariant Interest Region Detection with an Array of Anisotropic Filters", U.S. patent application Ser. No. 12/772,566 filed May 3, 2010 entitled "Media Fingerprinting and Identification System", U.S. patent application Ser. No. 12/788,796 filed May 27, 2010 entitled "Multi-Media Content Identification Using Multi-Level Content Signature Correlation and Fast Similarity Search", U.S. patent application Ser. No. 12/955,416 filed Nov. 29, 2010 entitled "Digital Video Content Fingerprinting Using Image Pixel Intensity and Color Information", U.S. patent application Ser. No. 13/076,628 filed Mar. 31, 2011 entitled "Scale/Affine Invariant Interest Region Detection with an Array of Anisotropic Filters for Video Fingerprinting", U.S. patent application Ser. No. 13/102,479 filed May 6, 2011 entitled "A Scalable, Adaptable, and Manageable System for Multimedia Identification", U.S. patent application Ser. No. 13/276,110 filed Oct. 18, 2011 entitled "Distributed and Tiered Architecture for Content Search and Content Monitoring", U.S. patent application Ser. No. 13/327,359 filed Dec. 15, 2011 entitled "TV Content Segmentation, Categorization and Identification and Time-Aligned Applications", U.S. patent application Ser. No. 13/590,701 filed Aug. 21, 2012 entitled "Media Content Identification on Mobile Devices", U.S. patent application Ser. No. 13/647,996 filed Oct. 9, 2012 entitled Audio Content Fingerprinting Based on Two-Dimensional Constant Q-Factor Transform Representation and Robust Audio Identification for Time-Aligned Applications", U.S. patent application Ser. No. 13/826,502 filed Mar. 14, 2013 entitled "Method for Efficient Database Formation and Search on Media Devices Acting Synchronously with Television Programming", and U.S. Provisional Patent Application Ser. No. 61/940,921 filed Feb. 18, 2014 entitled "A Method for Valuing and Targeting Advertising Using Media Content Recognition" have the same assignee as the present application, are related applications, and are hereby incorporated by reference in their entirety.

FIELD OF THE DISCLOSURE

The present invention relates generally to tagging multimedia content for content recognition, efficient sharing, reduced storage, and the like.

BACKGROUND

There are a myriad of currently available multimedia applications including DVR recording, cloud storage of content, foursquare checking into show information, and sharing applications, produced by companies such as Facebook™, Twitter™, Instagram™, Miso™, getglue, etc. Also, bookmark applications are well known, such as Pinterest™, cloud bookmarks, and the like.

However, these applications have various shortcomings with respect to sharing thoughts and comments during the multimedia consumption. For example, consider the example of a user is reading a book. When the user wants to comment on a particular chapter or a particular paragraph, the user may want to refer to a particular chapter or a paragraph on a specific page. Thus, the user's comments are best understood when associated within a particular context. When other users see these comments, they may need to understand the context which can be found by reading nearby sentences or paragraphs and this presents a need for further information that would not normally be conveyed with shared specific comments. Using general social networking services, users can share their thoughts, comments on a particular selection of multimedia content.

BRIEF DESCRIPTION OF THE DRAWINGS

FIG. 1E illustrates a search and tag networking system in accordance with the present invention.

FIG. 6A illustrates a process that describes how a video snippet is edited in accordance with the present invention.

FIG. 7 illustrates a process to access past tags and comments for a multimedia content in accordance with the present invention.

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1B:
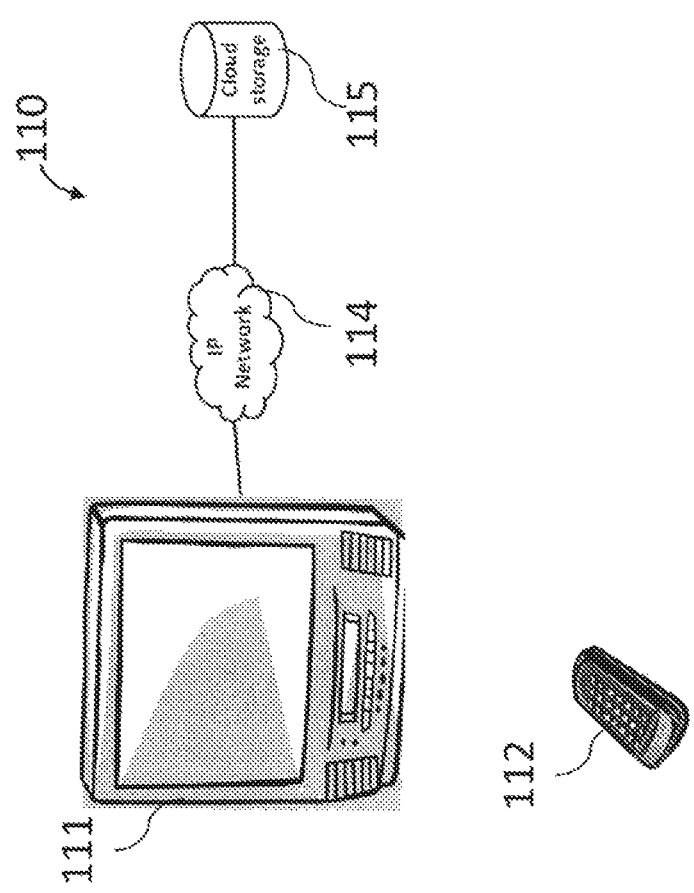
FIG. 1B illustrates a second exemplary system depicting devices and connections supporting TV content downloading, streaming, and online storage.

However, among several aspects of the present invention, this invention recognizes that with current social networking services, the sharing of further context on specific comments is much more difficult than desirable. For example, there is no easy way to for a user to indicate that a particular user's comment refers to the time instance 20 minutes and 20 seconds after the start of a TV program. The process of obtaining a time instance is difficult because, unlike books where chapters and pages give easy reference to the context, multimedia content doesn't have an analogous and easy method to mark a time instance of a context. Even if a device playing the multimedia content can capture a time instant of a multimedia event, the device may not be able to interpret the captured data, may not be able to track the multimedia event, and may not be able to include a captured time instant in the user's comments. Also, an additional problem is the lack of tools available to other users in receiving and interpreting the time instance to aid in understanding the context of the comment. Usually, to access multimedia content at a particular time, users need to search a multimedia database to find the desired content. After the content is found, users need to review this content up to that time instance in order to understand a context of a comment at a particular time instant. Such capability requires the device to include one or more applications having a play mechanism, possibly a fast forward mechanism or a tool allowing the user to positioning the cursor at a time instant in a content data stream and view the content at the cursor's location. Developing an application or applications that provide such capabilities is perceived as difficult to accomplish, take much effort and time and thus not considered commercially viable. This need to remember watched multimedia content for future reference, share it effectively and efficiently among the friends has presently not been met. Thus, there is a need for a method to organize, efficiently store and access multimedia content, and associate a user's comments to multimedia content that one views or hears.

In one or more of its several aspects, the present invention recognizes and addresses problems such as those described above. To such ends, an embodiment of the invention addresses a method to tag streaming multimedia content at specific times. A segment of multimedia content having a specified duration that was captured from streaming multimedia content is fingerprinted, wherein the generated fingerprints include timestamp information based on a current time of the captured segment of multimedia content. A user command to tag the captured segment of multimedia content is received.

A tag request is generated including the generated fingerprints, the timestamp information, and meta information associated with the streaming multimedia content. The requested tag is displayed with a tag label to identify the streaming multimedia content the tag is associated with and a label to identify the user that initiated the requested tag.

Another embodiment of the invention addresses a method of editing a snippet of multimedia content. A snippet of streaming multimedia content is accessed from a snippet database based on a displayed tag associated with the snippet. The snippet is displayed with an initial start point and an initial stop point of the snippet indicated in a film strip of the streaming multimedia content. A preferred start point and a preferred stop point are identified to edit the snippet to a modified snippet size and location in the streaming multimedia content. The modified snippet is displayed for user review and acceptance.

A further embodiment of the invention addresses a method of generating a playlist of highlights of a streaming multimedia content. A plurality of snippets is generated from the streaming multimedia content according to a specified duration. A playlist is created for the generated plurality of snippets. The snippets in the playlist are reordered according to a selected playtime. Snippets from the ordered playlist that are overlapping are processed to remove duplication of multimedia content from the reordered playlist.

These and other features, aspects, techniques and advantages of the present invention will be apparent to those skilled in the art from the following detailed description, taken together with the accompanying drawings and claims.

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer readable storage medium having non-transitory computer usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Python, Ruby, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other non-transitory form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

The following nomenclature is used in describing the present invention. For example, multimedia content represents any video, audio or audio-visual content. Multimedia content may also represent a series of photographs or pictures, a series of audio files, or other associated data, such as 3D video content or 4D content in which sensory feedback, such as touch feedback sensations, are presented simultaneously with visual and audio content. The terms signature and fingerprint both denote the same structure of a sequence of bits and may be used interchangeably. A fingerprint is generated to represent a unit of multimedia content using a fingerprinting method that operates on the unit of multimedia content.

This invention in one embodiment describes an application that addresses the problem of specifying a time instant in played multimedia content and provides a context around the played multimedia content. The application provides an easy to use interface to specify time instants, and allows the user to focus on sharing his or her comments and thoughts in context. Thus, the user's experience of the multimedia consumption is not diluted, not interrupted, and made more useful than current systems without such capabilities.

This invention in another embodiment allows users to tag, comment, share, like, and discuss, particular moments of multimedia content. Multimedia can be TV shows, games, speech, conferences, online videos, radio channels, advertisements, promotional shows, promotional videos, music videos, songs, and the like video, audio, and combinations of video and audio. People can view, review and create thumbnails, thumb clips, tags, comments, audio comments, other meta information, markers to share specific content with other users and groups of users. Users are also able to view, review, and follow specific multimedia content, groups of multimedia content, and other users in real-time.

Multimedia fingerprinting technology has outgrown from a research technology to a mainstream commercial technology in recent years. The fingerprinting technology is based on feature extraction and then converting these features into digital signatures that can be stored in a database. Such features can then later be searched for various purposes such as to find contents having a particular features, or a set of features, or to find contents that are similar to query content. In general, an automatic content recognition (ACR) system is used in the following way. A fingerprinting program analyzes reference multimedia content and creates signatures for the content. A search system loads these signatures into its databases. Whenever a search needs to be performed on another portion of multimedia content to check if it is comparable to any of the stored contents in the database, the fingerprinting program generates query signatures by analyzing the query content. The generated signatures are then sent to the search system which runs a search across the stored signatures. The matching content is identified if a match is found. The whole operation can be automated without user intervention and it can be done periodically.

Other types of applications that have gained immense popularity and adaptation among users are the chat-rooms, social networking applications and websites. These websites let the users share various activities among their friends, co-workers or groups of peers. Some applications let users follow activities of other users via instant notifications or via status updates. Such social networking features are used to share information, such as personal updates, interests, current status, and the like. For example, a user might be watching a football game and would like to share their thoughts on the football game with a group of friends. Social networking sites let him or her share their thoughts on the website and then notify the group of friends about it.

Even though various avenues exist to share comments about real-time events, a live TV program, or any multimedia content on the social networking site, it is necessary to use particular markers such as hashtags to associate these comments to a particular event. A hashtag, by itself, does not allow a user to specify a time instant in a TV program at which point the comment refers to. Hence, all the applications cannot directly utilize richer metadata and relationships between comments, a program timeline, and the program details to deliver a better experience to the users. Users cannot easily generate a list of programs, episodes, and scenes that they have liked in past. Even if they have commented on the program on social networking sites, they cannot easily assemble this information to generate a list of the programs that they have commented on.

The current invention bridges this gap between automatic content recognition (ACR) and social networking. The techniques described herein provide users an ability to tag multimedia content that they are watching and/or listening.

A tag in this context can be applied in a variety of different contexts and ways. The tag can be a text comment, it can be an audio/video comments, it can be a hashtag, it can be a plain label, or it can be just a marker in the program like a bookmark in a book. A tag associates a digital entity, such as a text comment, or even an audio/visual comment can be directly associated with a particular moment in the TV program.

Consider the above mentioned scenario in which a user is following a football game. Suppose the user likes a particular touchdown very much. At the time the touchdown is made, he makes a comment "#touchdown—what a great run!". Current mobile applications do not have any knowledge about the event or time instance at which the user generated these comments. However, in accordance with the present invention, a mobile application is used to share the user's thoughts that runs an ACR algorithm on the user's device in the background or runs ACR algorithm at the backend search system on behalf of the user's device. This inventive application then sends the text comments to a tag service in a search system along with query fingerprints of a video snippet of specified duration, for example—of thirty second duration, of the identified event, in this case a particular touchdown. The search system first runs a search using these query fingerprints. If the search system successfully finds a match for the query fingerprints that specifies the match from 20:20 to 20:30 in that game, a tag service then associates the user's comments at the instance 20:20. The tag service also creates a video snippet, i.e. a short video clip of the multimedia content, of the game event of a specified duration, for example one minute, around that time instance from 19:50 to 20:50. The time instant 19:50 is selected that is half a minute before from the start of the ACR match at 20:20. Now, whenever the user shares his comments with his/her friends, the friends know the exact moment during the game this comments was made and they can also watch the snippet to understand the context of this comment.

Note that it is not necessary to have ACR capabilities to find a match time. The match time can be derived with other information that is available in a tagging system as described herein. For example, the device that sends a tag request to the tagging system, instead of attaching fingerprint with the request, the device can send the time of the request, which generally is the current time, and program information that was being watched at the time of the request and that is known to the tagging system. The program information may be available directly to some devices such as a TV or a set top box receiving the broadcast channel. In such a case, the device knows which program it is tuned to so it can automatically include this information in the user request. If the device does not know which program is playing or was played at the time of the user request, then such input can be sought directly from the user. The search system then can then use this information to know that the user initiated the tag information around 20:20 into the program.

After the game, the user can review all of the comments that he or she has made. All these comments can be arranged in a "playlist" with the name "xyz game". In this case, all the video snippets can be reviewed consecutively in the form of a personalized video highlight of that game. Suppose the user tags every touchdown during the game with a comment that contains words "#touchdown", the tag service can automatically create a playlist titled "xyz games: #touchdown" that contains all of the touchdowns of that game. Thus, by filtering the playlist "xyz game" with the filter "#touchdown" on hashtags, a new playlist having the touchdowns of the xyz games is automatically generated by the tag service. Such filtering and editing operations can be done later after the initial comments are made. Note that a user need not watch a game while it is being played. The user can watch a recorded game, using DVR, or streaming services, or a repeat telecast, for example, and still can make use of the tagging services as described herein. An ACR system provides one of the means to enable such function. If ACR is not available, then an application can still achieve the same behavior, if the application can infer or otherwise deduce the instance at which the comments are made. Such inferences and deductions are possible if the application works in conjunction with streaming the TV content, or the application knows the TV channel or program the user is watching and the current time.

An embodiment of this application advantageously utilizes ACR to log a time instance when the tagging is performed. The ACR application may be embedded in devices that a user is utilizing. ACR searches can be done in the user device or on a remote server. If the embedded ACR provides timing information, extended searches to a remote search database may not be required, assuming sufficient metadata associated with a timing event is available on the local user device. If the device itself runs a local ACR, then along with the comments, the device can provide match timing information to a tag service also located on the device. In such a case, the tag service does not need to run a search as it already has the search results. For example, a web-connected TV, a photo-frame hanging on a wall, a handheld mobile phone, a handheld remote control, a tablet, or any other device may embed an application having an ACR function, as described herein. A common requirement for all such devices is that these devices be able to monitor TV or audio program by direct audio/visual (a/v) stream access or by indirect methods, such as capturing ambient audio via a microphone. These devices are also required to be able to communicate with a search system for handling ACR queries.

A user's device is configured, by downloading and enabling an application for example, to fingerprint multimedia content that is being currently played. For example, a connected TV fingerprints an audio/video stream that is currently being played. In another example, a handheld mobile device fingerprints audio by listening via its embedded microphone. Whenever the user wants to add a tag at a particular time in the multimedia content, the user initiates tagging by turning on a "tag" button, which may be a software enabled user interface (UI) button or a real hardware button on the user's device. As soon as the tagging is initiated, the user device starts fingerprinting monitored content for a specified time. While tagging is occurring, the user may enter additional data such a comment text. Once enough fingerprints are gathered, as pre-specified by a timer duration for example, the user device makes a tag query with the ACR search system. The ACR search system receives the tag query along with the gathered fingerprints and the tag information. The ACR search system first runs a search query to determine if there is a match to the content that user was consuming. Once the search system returns a match, the tag service then associates the user tag and related metadata, such as comment text, to the match content at the match time. Multiple such tags can later be shared, arranged, viewed, and modified as specified by further capabilities of the application.

Using the functions mentioned above, the following can be achieved. Users can store and review multimedia content, such as TV shows that they had liked in past. By analyzing the user tags, the parts of multimedia content, such as a game, that are most interesting from a user perspective can be found. Also, user derived promotional clips can be generated automatically by stitching together most comment spots in the content. The user tags can be analyzed and recommendations made for watching other multimedia content. Users can receive and watch snippets of tagged contents, such as snippets of movie trailers, TV shows, and advertisements, and if they like what is shown, they can be presented with an easy mechanism to download and if appropriate to purchase the full multimedia content. Such tagging capability also enables users to more easily purchase other related content and advertised products. Tagging, as described herein, also enables various data analytics such as tracking user behavior, statistics of viewing habits and popularity and trends in multimedia consumption in a more contextually focused and ad nuanced way.

Figure 1A:
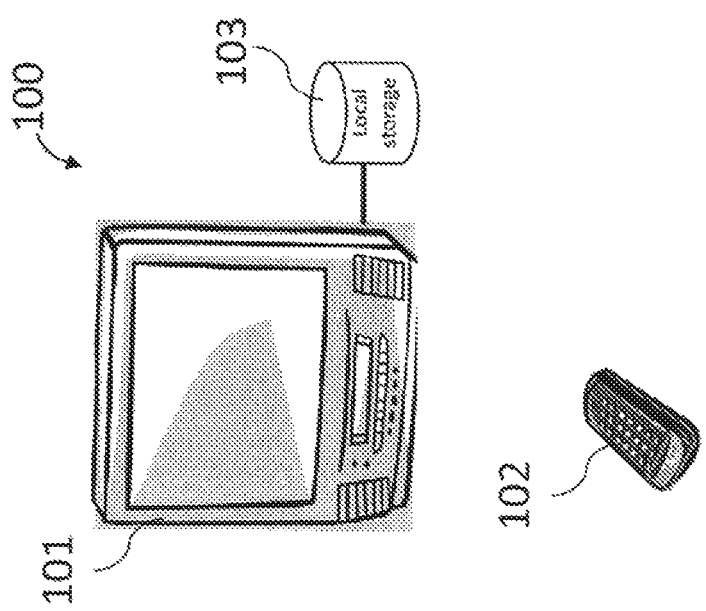
FIG. 1A illustrates an exemplary system having various devices, such as a television (TV) device, a remote, and local storage.

FIG. 1A illustrates an exemplary system 100 employing illustrative devices such as a television (TV) device 101, a remote 102, and local storage 103. In one exemplary scenario, users receive the TV content linearly by interacting with the TV 101 using only a remote 102 as the way to change a TV program. However, with the introduction of DVRs, users could record TV shows on a local storage device 103 associated with the TV, such as a separate DVR box as shown in FIG. 1A. A user can initiate recording of the TV program displayed on the TV and store it for further viewing or reference. The TV program content can also be stored in the Internet 104 connected remote cloud storage 105 as shown in FIG. 1B instead of the local storage device 103 as shown in the FIG. 1A.

Figure 1D:
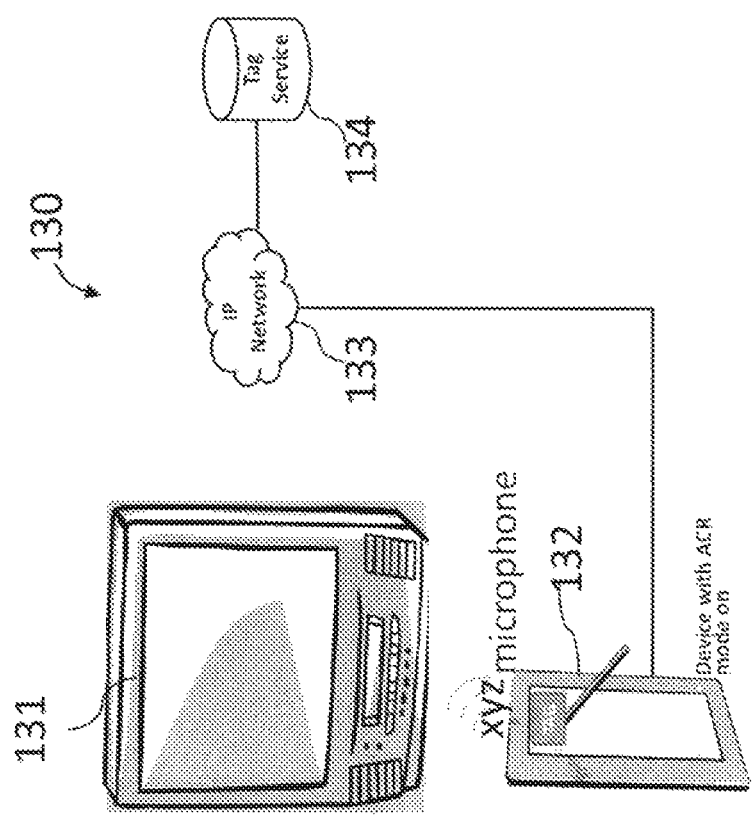
FIG. 1D illustrates use of tagging in association with automatic character recognition (ACR) in accordance with the present invention.
Figure 1C:
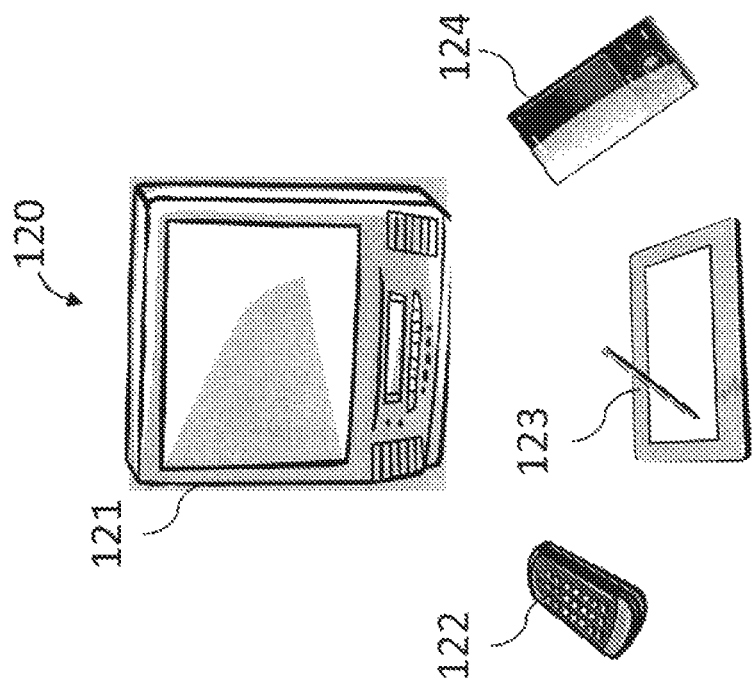
FIG. 1C illustrates a high level view of various media devices with reference to a TV content source.

FIG. 1C illustrates a high level view 140 of various media devices with reference to a TV content source. Many users engage with multiple devices such as the remote 102, phone 142, and a tablet/computer device 141. This varied engagement has led to development of second screen experiences and second screen applications. Many users of TV like to share their TV watching experience with their friends over social networks. The sharing with their friends can also happen across the Internet and through various second screen applications associated with each user's device. However, in current second screen applications, the important aspect of timing information is missing. The timing information can be added by associating the time of a tag to real time TV content currently being aired. However, this approach does not work when a user is watching non real time TV content—for example when the user is watching DVR content, or is watching pre-recorded content, such as a movie. For this application, there is generally no difference if the multimedia content is a live program, a repeat telecast, or recorded content played from the Internet or a DVD. With the present invention, an automatic content recognition (ACR) application may be advantageously configured to provide relevant timing information in such applications. In FIG. 1D, the tablet device 141 runs an ACR fingerprinting algorithm through which a tag service and ACR search algorithm can run locally on the tablet and obtain timing information about content being watched when a tag action is initiated.

FIG. 1E illustrates a search and tag networking system 140 in accordance with the present invention. The search and tag networking system 140 comprises a user device 142, a remote download and remote search server system 156, and a network, such as the Internet 154. The user device 142 comprises a display 143, a microphone 144, a camera 145, and a program control circuit 146. The program control circuit 146 comprises a processor complex 147 having one or more processors, a program memory 148 comprising an instruction memory such as a random access memory (RAM), a flash RAM, and the like, a storage memory 149 comprising data storage, such as a RAM, a flash RAM, disk storage, and the like, and a network interface 150. The computer program stored on program memory 148 may be downloaded from a computer readable storage medium having non-transitory computer usable program code embodied in the medium. The remote download and remote search server system 156 comprises one or more download and remote search servers 158 and one or more databases and associated storage units 160.

Figure 2A:
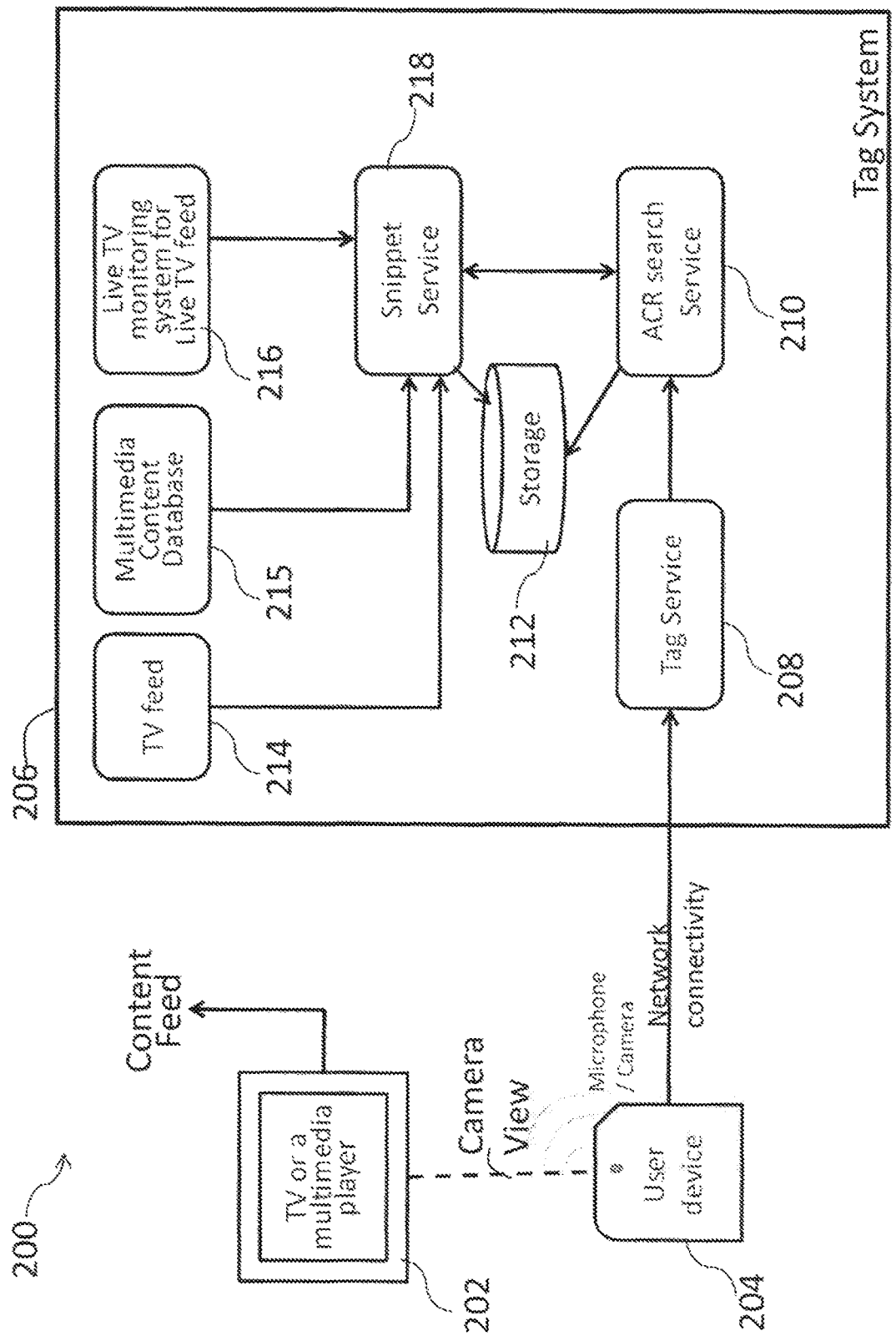
FIG. 2A illustrates a remote tagging system for generation and use of a tag with automatic recording of a TV clip, the TV clip length managed by start and end tags, along with addition of audio/text/photo comments in accordance with the present invention.

FIG. 2A illustrates a remote tagging system 200 for generation and use of a tag with automatic recording of a TV clip, the TV clip length managed by start and end tags, along with addition of audio/text/photo comments in accordance with the present invention. In this embodiment, the remote tagging system 200 comprises a TV 202, a user device 204, such as a tablet, and a search tag system 206 that operates remotely from the user device 204. The search tag system 206 comprises a tag service 208, an automatic content recognition (ACR) search service 210, a storage device 212, a snippet service 218, a television (TV) feed 214 for receiving currently playing TV programs, a multimedia content database 215, and a live TV monitoring system 216. The storage device 212 stores tags and associated content, playlists, information about users and user groups while the multimedia content databases 215 stores the raw multimedia content such as mpeg movies. Snippets that have been created by the snippet service 218 are also stored in the storage device 212.

The remote tagging system 200 supports users watching multimedia content, such as a program on a cable network on the user's TV 202. The user is also using his tablet device 204. The tablet device 204 has initiated an ACR application by which it is able to synchronize to the content that is being currently listened to and viewed. The tablet ACR application can be configured in multiple ways. For example, the tablet ACR application can be configure to use the TV audio by receiving audio input from the microphone on the tablet device 204. The tablet ACR application interfaces with the remote search tag system 206. The tablet ACR application includes processing and storage requirements that may be configured to process the TV display on the user's TV 202 using the tablet's camera separately from the tablet's microphone or jointly with the audio input from the microphone on the tablet 204. The tablet application can also be configured to use the user device's current time information in case of a live TV program. When the user initiates a tag action, as received at the tag service 208, the user initiated process, as described in more detail below, may provide media fingerprints, text comment, audio comment, identify already stored specific tags, control information such as the clip length for the tag, and sharing semantics to be associated with this tag. Using the media fingerprints, the ACR system 210 recognizes the multimedia content and the time in the content the user is watching or listening. The ACR system 210 then passes this information to the snippet service 218. The ACR system 210 stores the content and other meta information, such as content information, playlists, information about users and user groups associated with the tag, to the storage device 212 for the future reference. A snippet of the multimedia content that the user is tagging is also recorded and stored along with the tag in storage 212.

The access and processing of a snippet is achieved by a method described below. The ACR system 210 can initiate generation of a snippet or the device can initiate generation of a tag. In this case, the tablet 204 can initiate capture of a snippet. A live TV feed 214 can be monitored on the backend in the snippet service 218 and snippets can be generated from these feeds. For non-broadcast multimedia content, a separate multimedia content database 215 that holds the non-broadcast multimedia content can provide the non-broadcast multimedia content to the snippet service 218 which then generates the snippets at user selected sections of the content. The length of the snippet and or the start and end times of the snippets can be controlled by the user. Along with the snippet, other metadata information such as close caption text information about the multimedia content is also generated in the snippet service 218. The snippet service 218 can generate a preview of the snippet along with the snippet and the snippet service 218 can generate a thumbnail picture for a snippet. When a complete tag action is finished, the storage device 212 would store relational information, such as user added comments and tags, a snippet of the multimedia content around the tag time, a thumbnail of the snippet, user provided photo or photos, sharing semantics, and meta-information about the content.

Figure 2B:
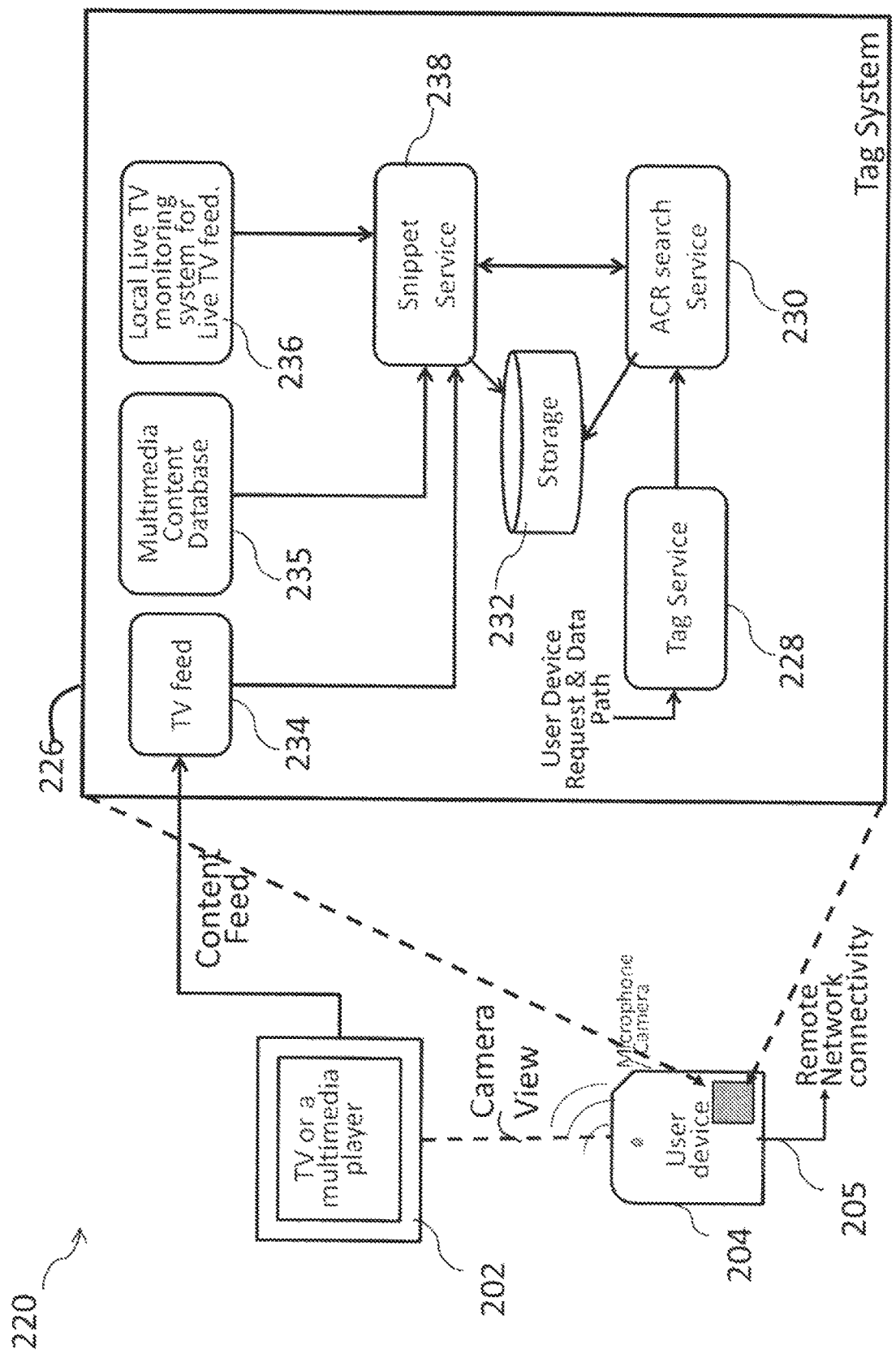
FIG. 2B illustrates a local tagging system for generation and use of a tag with automatic recording of a TV clip, the TV clip length managed by start and end tags, along with addition of audio/text/photo comments in accordance with the present invention.

Note that all or some of the functions surrounded by the box 206 can be done locally on a user's device. For example, the ACR search 210 can be carried out locally on the tablet device 204. FIG. 2B illustrates a local tagging system 220 for generation and use of a tag with automatic recording of a TV clip, the TV clip length managed by start and end tags, along with addition of audio, text, or photo comments in accordance with the present invention. In this embodiment, the local tagging system 220 comprises a TV 202, a user device 204, such as a tablet, and a search tag system 226 that operates locally on the user device 204. The search tag system 226 comprises a tag service 228, an automatic content recognition (ACR) search service 230, a storage device 232, a snippet service 238, a television (TV) feed 234 for receiving currently playing TV programs, a multimedia content database 235, and a live TV monitoring system 236. The storage device 232 stores tags and associated meta information, such as content information, playlists, information about users and user groups while the multimedia content database 235 stores the raw multimedia content such as mpeg movies. Snippets that have been created by the snippet service 238 are also stored in the storage device 232. In this system, the tags and snippets are stored locally to be received locally as requested by the users. These tags can of course be shared with other users using network connectivity 205 and through defined APIs which can share different tags, snippets and playlists with other such devices that run similar services locally or with the remote system that runs these services as shown in FIG. 2A.

The system 220 supports users watching a multimedia content, such as a program on a cable network on the user's TV 202. The user is also using the tablet device 204. The tablet device 204 has initiated an ACR application by which it is able to synchronize to the content that is being currently listened to and viewed. The tablet ACR application can be configured in multiple ways. For example, the tablet ACR application can be configured to use the TV audio by receiving audio input from the microphone on the tablet device 204. The tablet ACR application interfaces with the remote search tag system 206. The tablet ACR application includes processing and storage requirements that may be configured to process the TV display on the user's TV 202 using the tablet's camera separately from the tablet's microphone or jointly with the audio input from the microphone on the tablet 204. The tablet application can also be configured to use the user device's current time information in case of a live TV program. When the user initiates a tag action, as received at the tag service 228, the user may provide a text comment, audio comment, identify already stored specific tags, control information such as the clip length for the tag, and sharing semantics associated with this tag. The ACR system 230 recognizes the multimedia content and the exact time in the content the user is watching or listening. The ACR system 230 then passes this information to the snippet service 238. The ACR system 230 stores the content and other information associated with the tag to the storage device 232 for future reference. A snippet of the multimedia content that the user is tagging is also potentially recorded and stored along with the tag in storage 232.

Note that it is possible to construct various combinations of local and remote services. A common system configuration would be to have ACR search both at a local system, such as a user device, and at a remote system, having servers and extensive database storage capacity. If the local search cannot detect a match, then the local device sends fingerprints to the remote system along with the other tag details using remote network connectivity 205. The remote system then can run more extensive searches to check for a match to queried content.

Figure 2C:
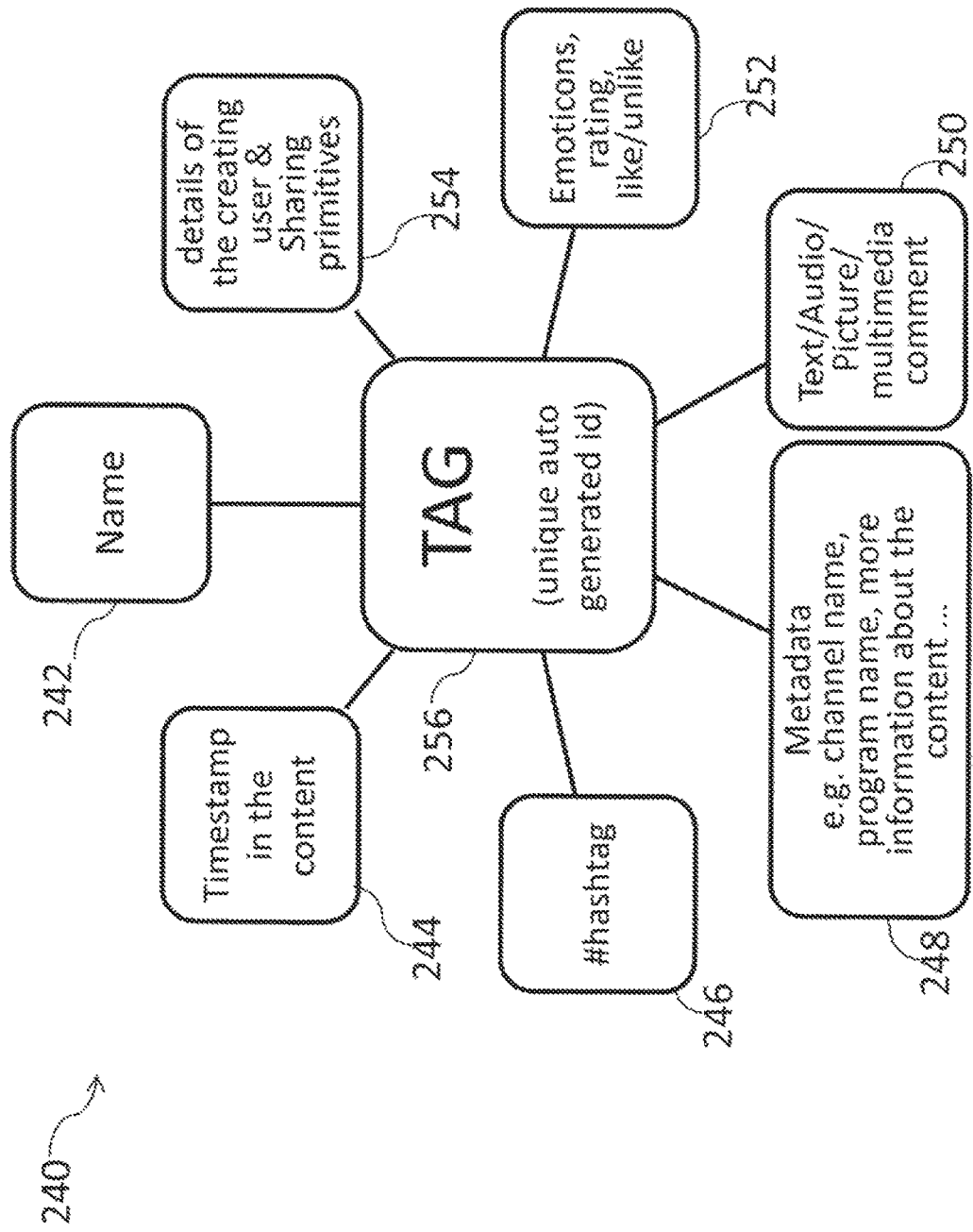
FIG. 2C illustrates a schematic description of a tag in accordance with the present invention.

FIG. 2C illustrates a schematic description 240 of a tag in accordance with the present invention. In the search tag systems 206 of FIG. 2A and 226 of FIG. 2B, a tag is defined as described in FIG. 2C. A tag is a software defined entity that has multiple components. The tag has a unique identification (id) number 256 that defines it. The tag contains a name 242, for example "#touchdown—What a great run!" which may not be unique among all the tags. The tag contains details of the user who created it and sharing primitives 254 regarding sharing of this tag. The sharing primitives may include a list of users, and groups who are specifically allowed to view this tag, and other security and privacy settings such as whether a tag, comments, and associated metadata can be seen publicly. The tag contains the user comments 250 such as "What a great run!" or other audio/video comments from the user. The tag contains the metadata information 248 related to the content such as "the channel name, program name, the program details, close caption text". The timing information 244 is also stored along with other information in the tag. Thus, continuing the football example, the timing information 244 would be—time instant 20:20, snippet begin 19:50, snippet end—20:50. The hashtags 246 that the user might have added are parsed and stored separately. Along with this tag are the emoticons, ratings, like or dislike counters 252 that are dynamic depending on the feedback from the other users. A tag may be created comprising bit fields of varying length for the components 242, 244, 246, 248, 250, 252, and 254.

Figure 2D:
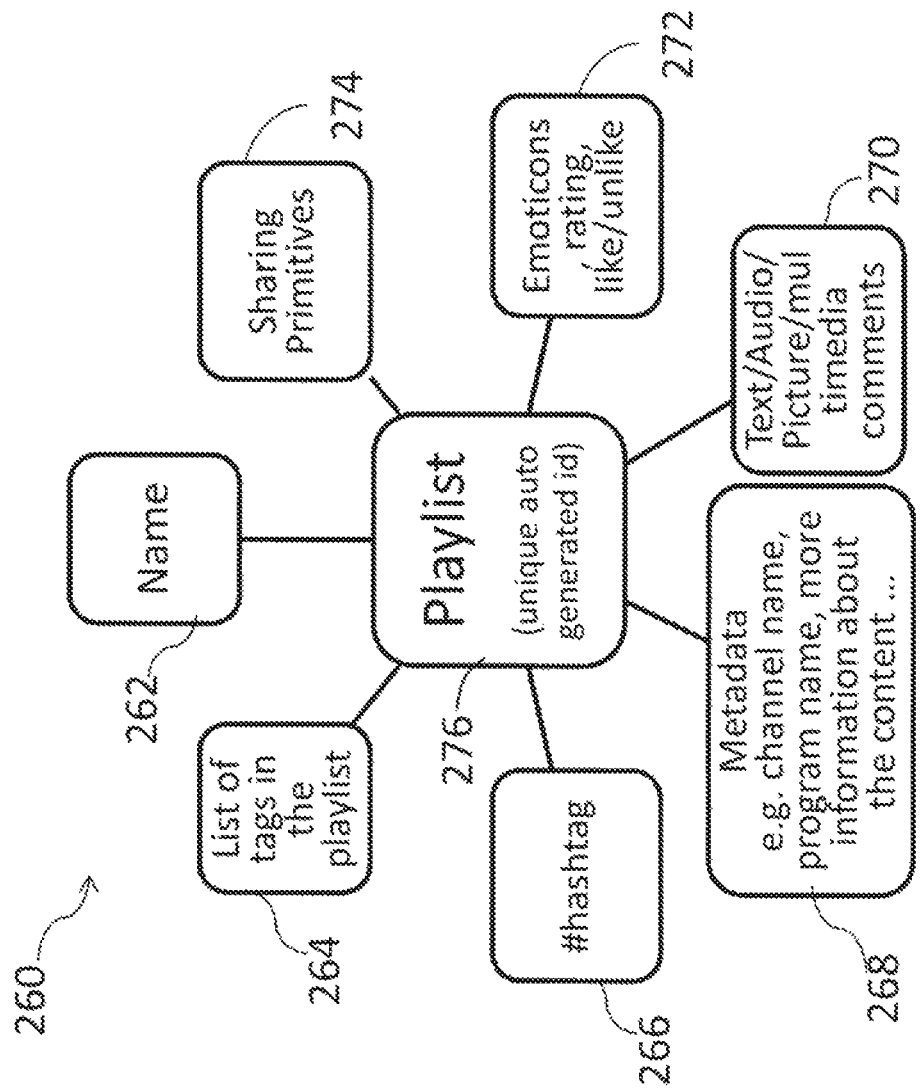
FIG. 2D illustrates a schematic description of a playlist in accordance with the present invention.

FIG. 2D illustrates a schematic description 260 of a playlist 276 in accordance with the present invention. As shown in the FIG. 2D, the playlist 276 is a sequence of tags having components similar to the components of a tag. The playlist 276 is also defined using a name such as "#touchdowns—xyz game" 262. The playlist 276 also has its own sharing primitives 274, comments 270, metadata information 268, hashtags 266, and emoticons 272. Instead of the timing information of the tag, the playlist 276 also contains an orderly list of tags 264 that constitute the named playlist. When a playlist is played, the snippets from all the constituting tags are played in the defined sequence. A playlist may be created comprising bit fields of varying length for the components 262, 264, 266, 268, 270, 272, and 274.

An ACR application can also be loaded and configured in the TV device, such as TV 203, or in a device that receives the video signal from cable or devices, such as a DVR box, a DVD player, a tablet, or a laptop computer, for example. In such cases, a tag request to the tag service can also be generated at these devices or the tag request can still be initiated at the tablet device. The tags can also be initiated from multiple devices.

Multiple users potentially can initiate tags at the same time. If snippets are being generated for each tag, then these snippets can be shared and stored together to reduce the storage space. The sharing can be done a number of different ways. For example, snippets having the same start and end time, within a selected time tolerance, do not need to be stored separately with only one copy stored. For snippets having similar start and end times, a new snippet with the smallest start time and largest end time can be created. This snippet can then be stored instead of all of the other snippets associated with this time period. Of course some rules need to be adhered to so that the resulting snippet is not too long. A third alternative is to store only longer snippets and whenever a shorter snippet is needed, then an underlying software program modifies a longer snippet to serve the requested smaller snippet. In this case, the longer snippets subsume a shorter snippet utilizing additional metadata stored within the snippet. Continuing with our previous example, suppose another user also creates a tag for the touchdown at 20:20 with a comment "What a great touchdown!". Then the snippet from 19:50 to 20:50 associated with tag need not be recreated, rather the previous snippet video can just be shared. Note that even though the snippets are same, the tag title, comments, hashtags, creating user details and sharing information of these tags would be different.

Figure 3:
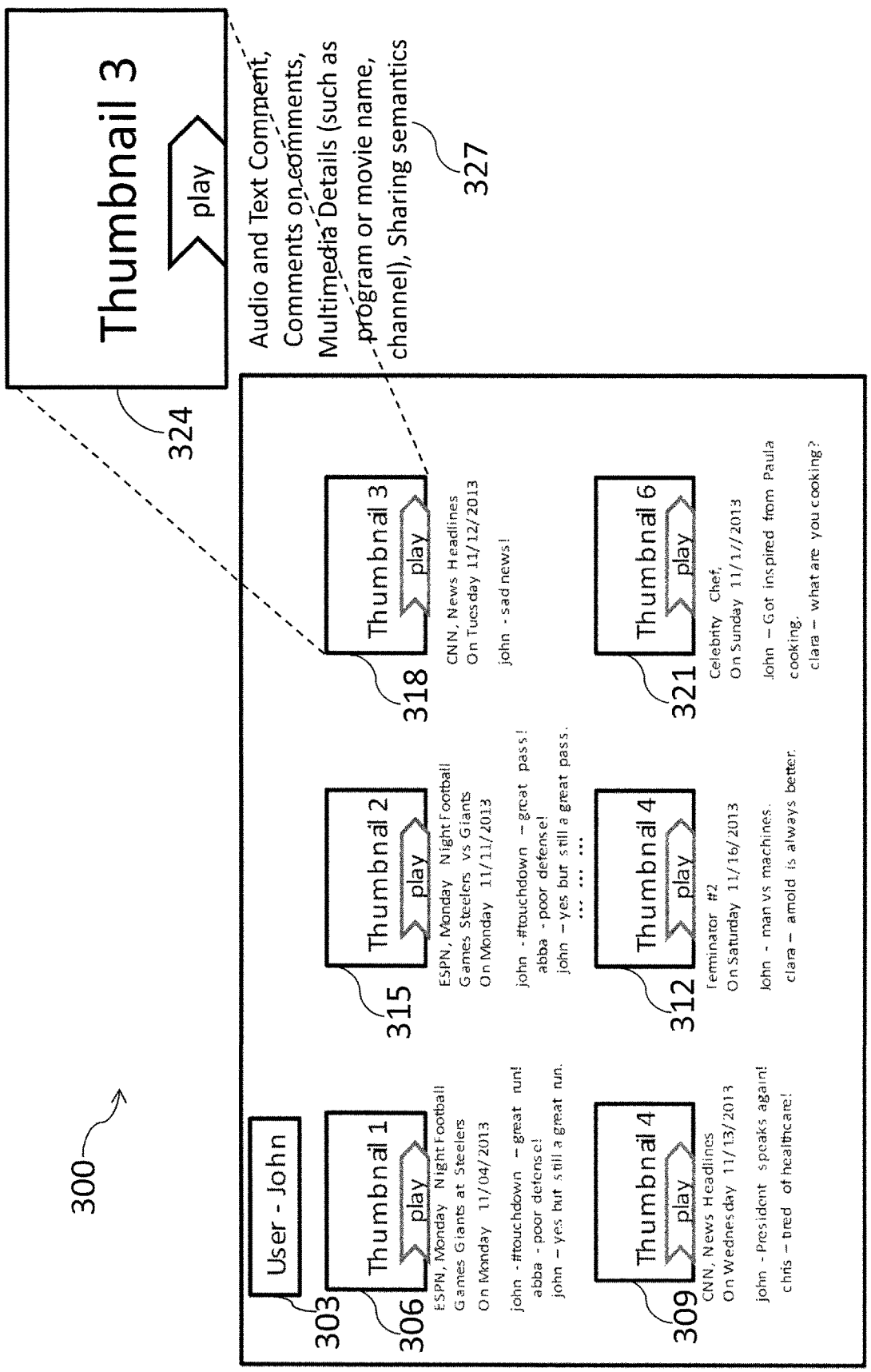
FIG. 3 illustrates an exemplary display of tags, comments associated with thumbnails, and video snippets in accordance with the present invention.

The user can create sequences of such tags for the same or different contents at different times. FIG. 3 illustrates an exemplary display 300 of tags, comments associated with thumbnails, and video snippets in accordance with the present invention. The example shows an exemplary display 300 of the tags as seen by user John, identified by label 303. The display shows six tags 306, 309, 312, 315, 318, and 327 in use by John. These tags are from different channels, such as tags 306 and 315 associated with a channel, such as ESPN, and tags 309 and 318 associated with another channel, such as CNN, programs, such as tag 321 associated with the program "Celebrity Chef", and one tag 312 associated with a movie, "Terminator #2" are also illustrated. The first tag 306 is for the broadcast channel ESPN and is associated with a football game between Giants and Steelers that was played on Monday night Nov. 4, 2013. John has commented that "#touchdown—great run!" initially, as seen in the text under the tag 306. However, there is an exchange of comments following John's initial comment from another user named abba whose comment "poor defense!" is shown below and John's reply comment "yes, but its still a great run" is shown in response. User abba was able to see this tag and all its associated comments because sharing primitives associated with John's comment were set to allow abba to see and make comments that were shared.

A user's tags can be displayed in a list or matrix fashion with a thumbnail, such as thumbnails 306, 309, 312, 315, 318, and 321, or a user provided photo for each tag. The user can play each snippet by clicking the thumbnail 324. Also, the user can play each snippet associated with a thumbnail and can additionally edit the beginning and end of the snippet to adjust the length of the snippet. Also, a user can select a section of the multimedia content in the middle and make a snippet which is not contiguous in the original content. The user can also edit comments that he has made, and choose a thumbnail for the snippet. Users can see the detailed meta-information 327, such as close caption text, comments, channel name, program details. Tags containing this information can be shared as per the rules the user or the tag service 208 or 228 might have set. If these tags are viewable by another user, then that user would be able to see those tags. Users can also use filtering operations to select only the tags that they wish to see. For example, another user can choose to view tags from a particular program and only from a particular user. The filtering can be based on various tag parameters, such as the channel name, program name, comment text, hashtags, user, and time during the program, time of the program, close caption text as well as combinations of these tag parameters.

Figure 4A:
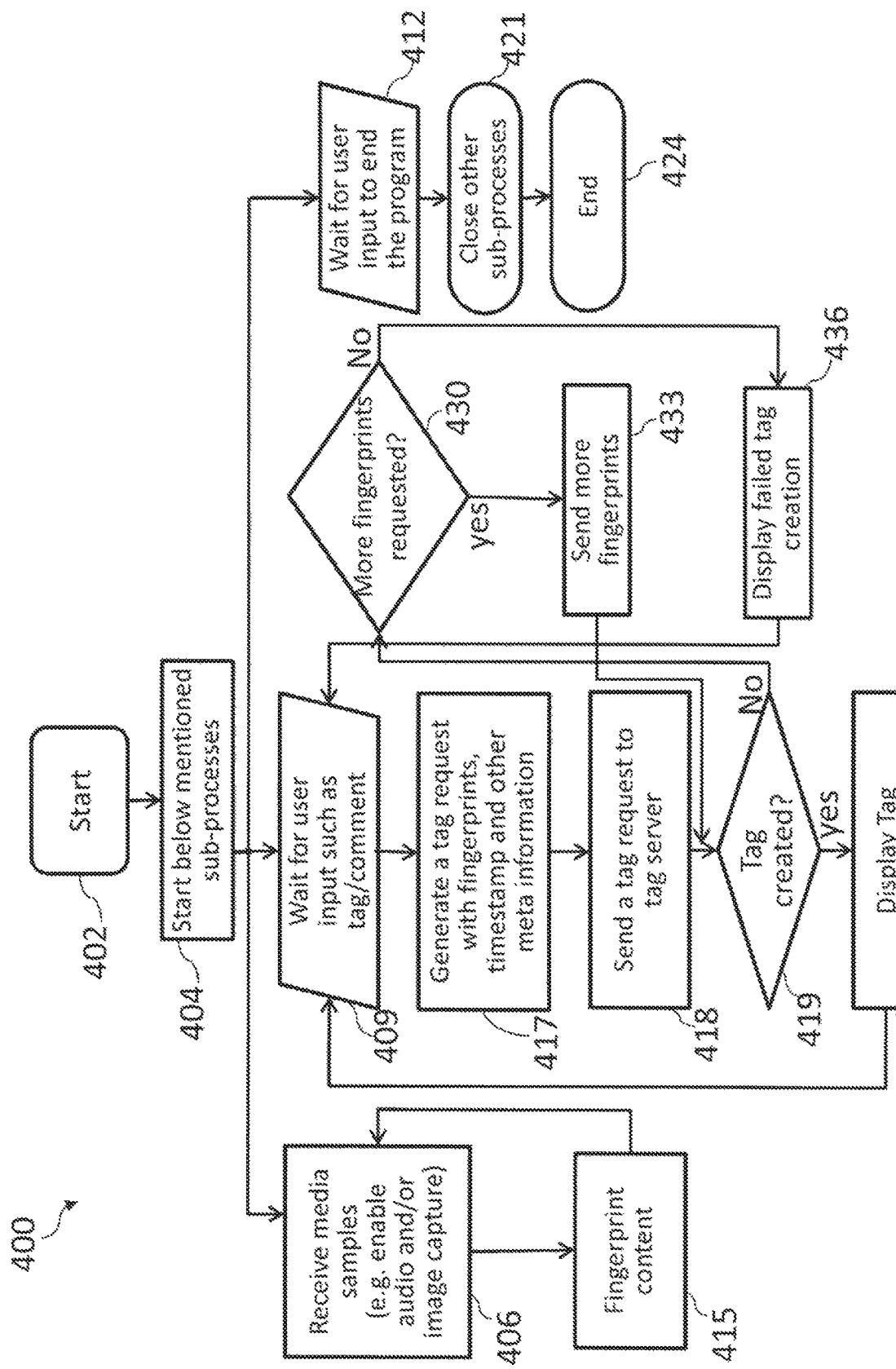
FIG. 4A illustrates a tagging process at a user device that enables tagging a multimedia content at a specific time in accordance with the present invention.

FIG. 4A illustrates a tagging process 400 at a user device that enables tagging multimedia content at a specific time in accordance with the present invention. At block 402, a user starts the tagging application. At block 404, different sub-processes of the tagging application are started to be run in parallel. For example, a fingerprinting sub-process associated with block 406, a sub-process associated with block 409, and a sub-process associated with block 412 are started in parallel. At block 406, multimedia content is captured for the fingerprinting sub-process, as a first sub-process, is initiated for the captured media content. At block 415, fingerprint content includes fingerprints which are generated for the streaming media content received for a specified duration and includes timestamps of the captured media content. Also, at block 415, fingerprints are generated for samples of streaming media content done periodically according to properties set up in the tagging application. Meta information is also associated with the fingerprinted captured media content, the meta information stored with the fingerprint content. After generating fingerprints for a specified duration of multimedia content, the tagging process 400 proceeds back to block 406 where a next portion of media content is received for fingerprinting.

At block 409, a user input process, as a second sub-process, is initiated that waits for user input, such as a user request or command to generate a tag for a captured segment of multimedia content or a user's generated comments or both. At block 417, whenever a tag/comment is requested as determined in block 409, the user specified tag and user generated comment and details, such as timestamps based on current time, generated from the fingerprinting sub-process at block 415, and other metadata, such as sharing primitives, and if known, the current multimedia details such as channel name and program name associated with the user specified tag are bundled together to create a tag request. At block 418, this tag request is sent to the tag service, such as tag service 208 of FIG. 2A or tag service 228 of FIG. 2B, along with the fingerprints from block 415 for a specified duration. After sending the user tag to a tag service, the tagging process 400 waits for a response from the tag service at block 419. If the response is positive and a tag is created then at block 427 the tag is displayed to the user and the process 400 proceeds to block 409 to receive a next user specified tag, comments, or both. If the response is negative at block 419, then the process 400 checks if more fingerprints are requested at block 430. The response at block 419 may be negative because the search system may not be able to find a match due to fingerprints being corrupted because they have been affected by noise or by the distorted content. Also, the response may be negative because the search system might not have the content the user is watching in its database. If the response at block 419 is positive, then the process 400 requests more fingerprints at block 433, proceeds back to block 419, stores the requested additional fingerprints with the requested tag, and waits for the response from the tag service at block 419. At block 419, with the additional fingerprints, a positive tag created indication is generally provided and the process 400 proceeds to block 427 to display the tag. Returning to block 430, if more fingerprints are not requested then the process 400 proceeds to block 436 where an indication is displayed that a tag request process 400 could not generate a tag. Then, the process 400 proceeds to the waiting state at block 409, waiting for user input request for a new tag.

At block 412, a closing process, as a third sub-process, is initiated which waits for user input to close the tagging process 400. At block 421, whenever the user requests to close the application, the application closes the first sub-process 406 and 415 and closes the second sub-process 409 and 418. At block 424, after all sub-processes are closed, the tagging process ends which closes the tagging application.

Figure 4B:
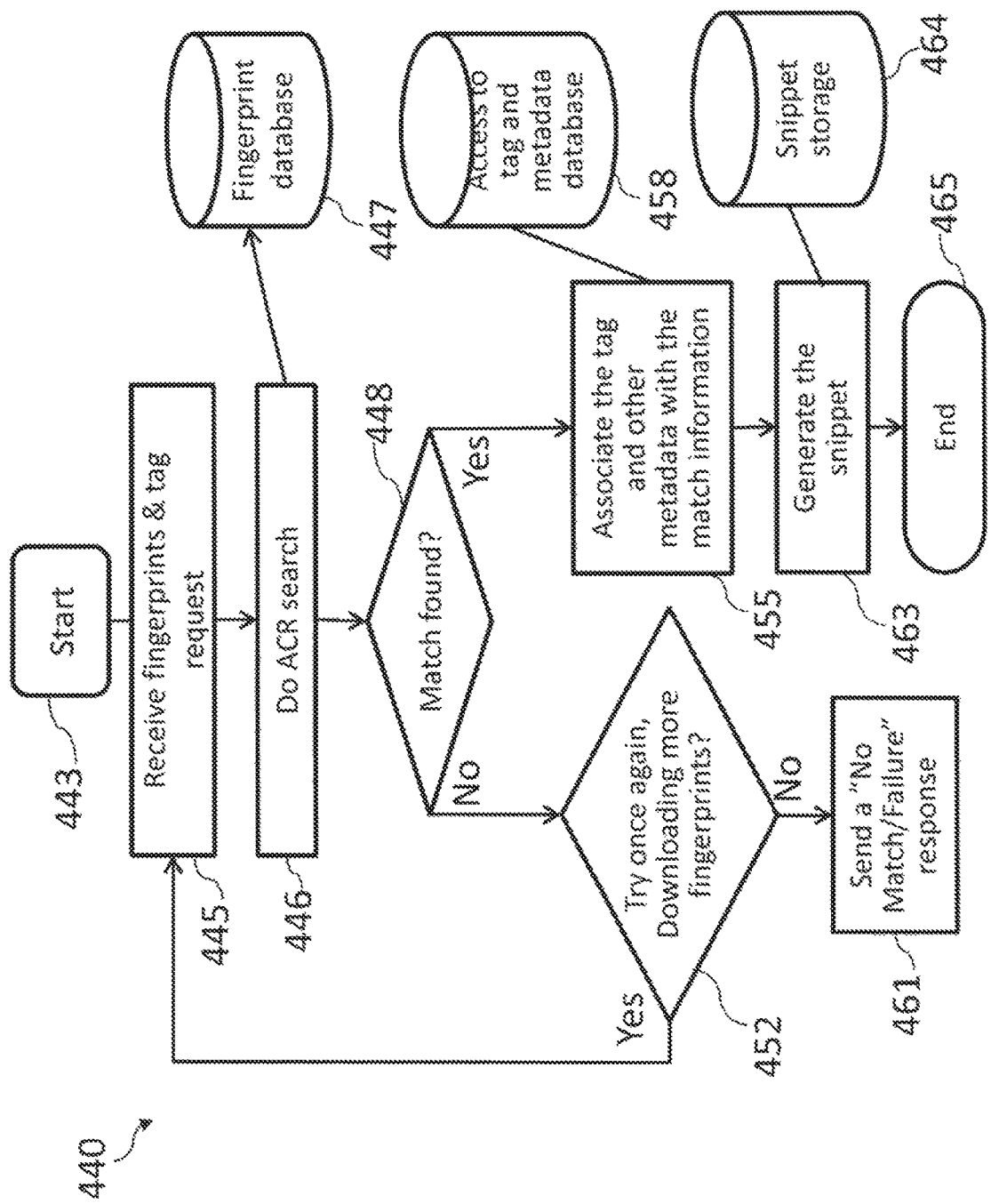
FIG. 4B illustrates an automatic content recognition (ACR) search and snippet generation process that operates at a search system to tag multimedia content at a specific time and recording of a snippet at the time in accordance with the present invention.

FIG. 4B illustrates an ACR search and snippet generation process 440 that operates at a search system to tag multimedia content at specific time and recording of a snippet at the time in accordance with the present invention. The search system may be located on the user device, such as on a smart phone, a tablet, a laptop computer, a desktop computer, and the like. At block 443, the ACR search and snippet generation process 440 is initiated and waits for a tagging request from the user. At block 445, the tag request generated at block 418 of FIG. 4A including fingerprints, a tag, and any comment are received by the remote tag service, for example, in a website providing the associated search services. At block 446, using a fingerprint database that stores fingerprints for original content accessible at block 447, a search is carried out at the ACR search system, such as ACR search system 210 of FIG. 2A. At block 448 a determination is made whether a match is found. If a match is found, the process 440 proceeds to block 455. At block 455, a new tag is created and is associated with the metadata and other match information accessed from the matching item. At block 458, the tag, associated metadata, match information, and fingerprints are stored in the tag and metadata store. At block 463, a snippet as requested by the user, is generated by snippet generation services, such as snippet service 221 of FIG. 2A. It is noted that at block 406, the multimedia content is captured for fingerprinting only. For example, on the user's device audio may be captured and fingerprinted without providing search and snippet generation on the user's device. At block 463, which may be on a server side to provide an expansive database support, the snippet is generated and returned to the user's device for displaying to user. At block 465, the process 440 ends after the snippet is generated and stored in the snippet storage accessed at block 464.

Returning to block 448, if a match was not found, the process 440 proceeds to block 452. At block 452, a determination is made whether sufficient fingerprints have been processed. If additional fingerprints can still be processed, the process 440 proceeds to block 445 where the additional fingerprints are requested from the client device so that an ACR search can be performed with more fingerprints. Block 452 corresponds to block 430 of FIG. 4A. At block 452, if no additional fingerprints are to be requested, such as may happen if the search operation of block 446 has been executed unsuccessfully for at least a pre-specified number of times, then the process 440 proceeds to block 461. At block 461, the ACR search and snippet generation process 440 sends a failure response to the user. Reaching block 461 can happen due to various reasons, such as having fingerprints that are corrupted by ambient noise in case of audio fingerprints, or reaching block 461 may happen because the TV program the user is watching may not be monitored by the ACR system. The failure response from block 461 is sent to the tag created block 436 of FIG. 4A indicating that tag creation failed. There are currently thousands of channels and such search services as described herein may only be authorized for selected channels, if desired.

Figure 5A:
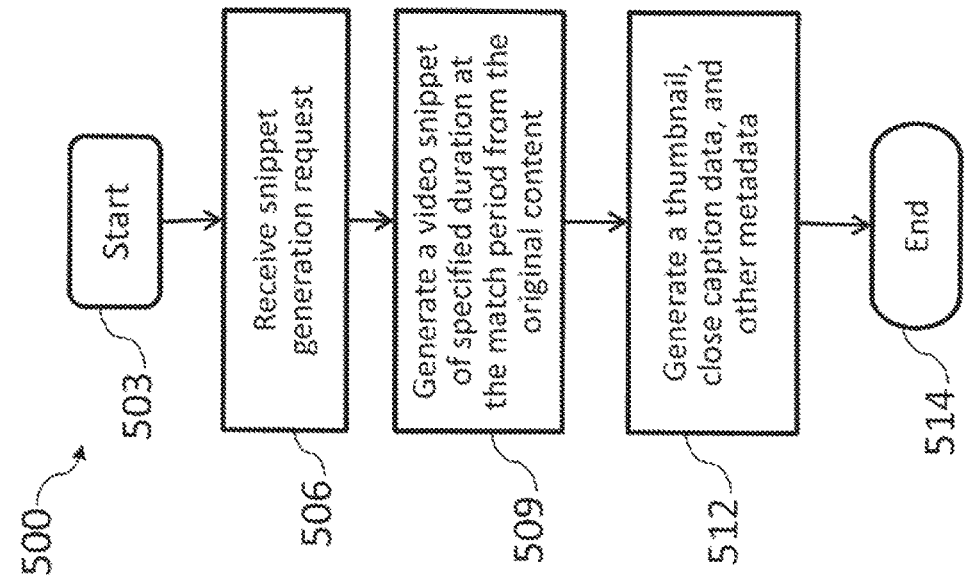
FIG. 5A illustrates a first snippet generation process that generates a snippet from the original multimedia content in response to a request in accordance with the present invention.

FIG. 5A illustrates a first snippet generation process 500 that generates a snippet from the original multimedia content in response to a request in accordance with the present invention. At block 503, the first snippet generation process 500 is started. At block 506, a snippet generation request is received that includes a match start and an end time, thereby providing a specified duration. At block 509, the snippet generation system, such as snippet service 221 of FIG. 2A, processes received multimedia content or received live TV channel program content and creates a small video clip of the specified duration around the match period, such as generated at block 455 of FIG. 4B. The generated snippet is stored for efficient access at block 464 of FIG. 4B. In the previous example, the match time was 20:20 to 20:30 and the snippet generation service selected a window of 19:50 to 20:50 to generate the snippet. At block 512, a thumbnail is generated for the snippet. The generated thumbnail is a selected image frame from the snippet and stored with the thumbnail is a closed caption text and other program data. At block 514, the first snippet generation process 500 is ended.

Figure 5B:
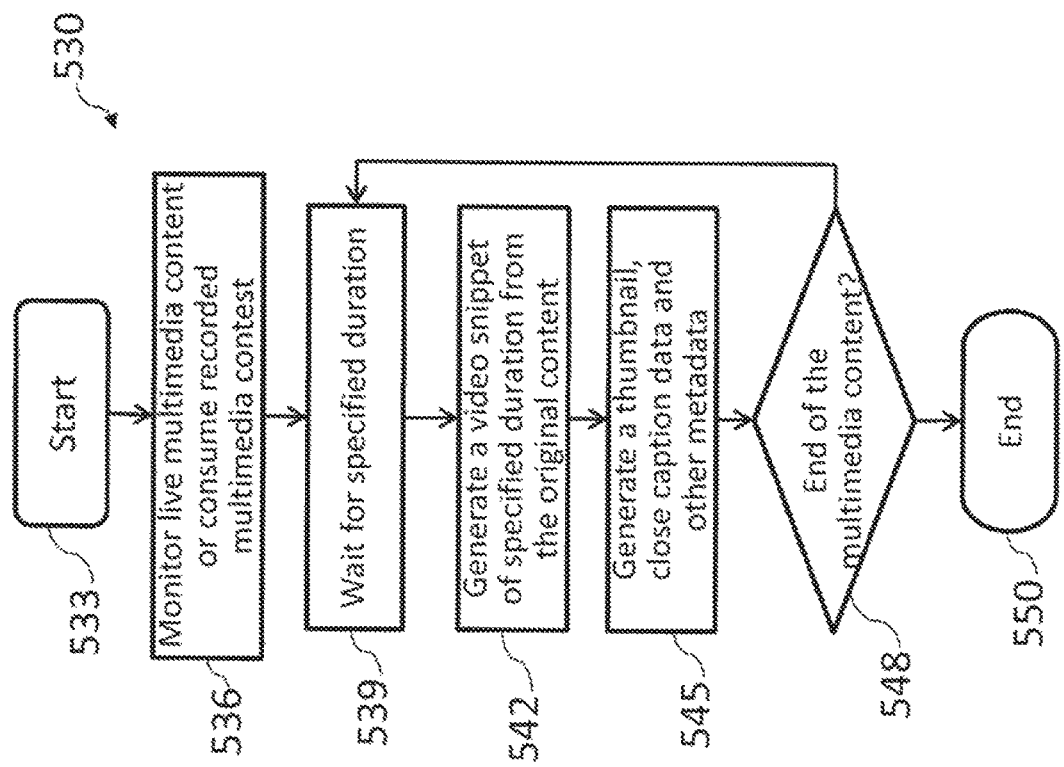
FIG. 5B illustrates a second snippet generation process that generates a plurality of snippets from the original multimedia content in accordance with the present invention.

FIG. 5B illustrates a second snippet generation process 530 that generates a plurality of snippets from the original multimedia content accordance with the present invention. By generating snippets in a continuous manner as described herein, two problems may be solved. For many TV programs, some aspects of a TV program gather more attention from the user audience. Such moments in a TV program receive more comments and many users simultaneously may tag and generate snippet requests for the same moments in the TV program. In such a scenario, the processing of tags and snippets requests would be computationally costly for a remote search and tag system to process and generate the same or similar snippets for all requesting users. Hence, by generating periodic snippets in an automatic and continuous manner as described herein and associating those periodic snippets with the user snippet requests according to closest match times, the processing becomes less computationally expensive. A similar process may be used on a local search and tag system on a user device to capture snippets in a first phase while a user may not be present and then associate the periodic snippets with user snippet requests generated at a later point in time when then user returns. A second benefit of generating such periodic snippets is that these periodic snippets may be shared across multiple comments from multiple users, for example, at time instances that are close enough to a requested time period. Thus, the storage requirement for snippets becomes more deterministic and more independent of the total number of the tag requests that might be received by the tag service.

At FIG. 5B block 533, the second snippet generation process 530 starts. At block 536, a live TV feed or recorded multimedia content is monitored. At block 539, the second snippet generation process 530 waits for a specified start time. At block 542, a video snippet of a specified duration is generated, such as 60 seconds for the previously described example. At block 545, a video thumbnail is generated that includes close caption data and other metadata. At block 548, a determination is made whether the TV live feed or recorded multimedia content has ended. If the program end has been reached as determined at block 548, the process 530 ends snippet generation operations at block 550. If the program end has not been reached, as determined at block 548, the process 530 proceeds to block 539 to wait for a next start period to record another snippet of specified duration. Following the second snippet generation process 530, a plurality of snippets can be created having pre-specified durations, such as {0 . . . 60 sec, 60 . . . 120 sec, 120 . . . 180 sec}, {20 . . . 60 sec, 80 . . . 120 sec, 140 . . . 180 sec} and the like. A single thumbnail is generated representing the plurality of snippets. Alternatively, a single thumbnail may be generated for each snippet of the plurality of snippets. It may be appropriate to associate each snippet with its own thumbnail since other metadata content, such as start and end time of the snippet, may be useful in providing the user with additional viewing capability.

Figure 6B:
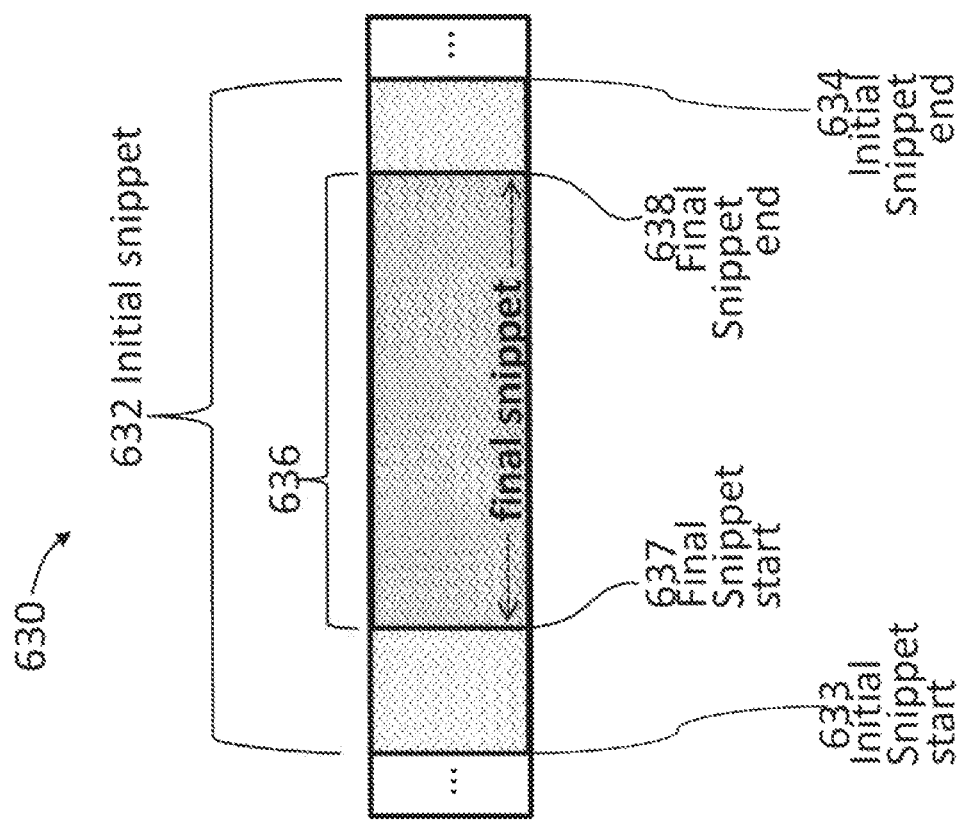
FIG. 6B illustrates a first video snippet being edited in accordance with the present invention.

FIG. 6A illustrates a process 600 that describes how a video snippet may be suitably edited by a user in accordance with the present invention. As described in the ACR search and snippet generation process 440 of FIG. 4B, the snippet generation system creates a video snippet automatically when a snippet generation request is received from the user device. At block 603, the process 600 is started. At block 606, the requested snippet, for example one of the periodic snippets automatically generated by the search and tag system, is displayed on the user device, such as the user's tablet. The snippet is displayed in a manner similar to that shown in FIGS. 6B and 6C. Usually a thumbnail is displayed in place of the corresponding snippet video. The user can edit snippets by a number of editing methods, two editing methods are described herein with reference to FIG. 6B and FIG. 6C.

Figure 6C:
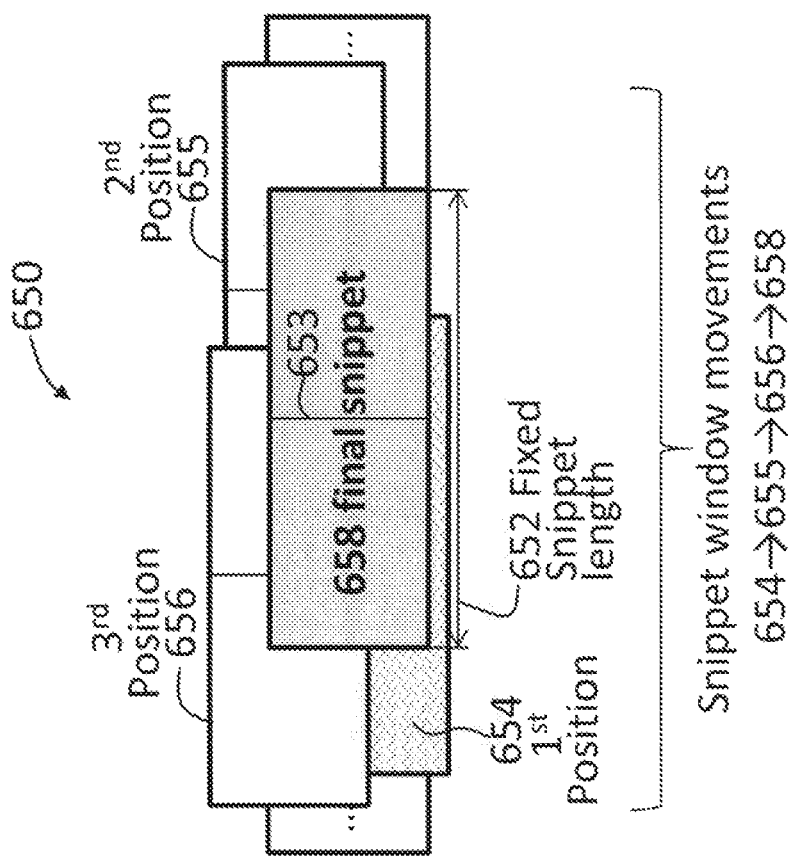
FIG. 6C illustrates a second video snippet being edited in accordance with the present invention.

A first video snippet editing method 630 is illustrated in FIG. 6B with an exemplary initial snippet 632. A second editing method 650 is illustrated in FIG. 6C with an exemplary initial snippet 654 having a fixed user defined length. In the first method 630 shown in FIG. 6B, the user can adjust the position of both the start point and end point of an initial snippet 632, allowing the length of the snippet to vary depending on the user's choice. With the initial snippet 632 on display, the user grabs the initial snippet start point 633 and moves it to a desired and final snippet start point 637. The user also grabs the initial snippet end point 634 and drags it to a desired and final snippet end point 638. The final snippet 636 has a user defined length.

In a second video snippet editing method 650 shown in FIG. 6C, the user chooses the length of the snippet 652 and then grabs the snippet in the first position 654 and moves it to a second position 655. Under an assumption that the second position 655 is not satisfactory, the user grabs the snippet from the second position 655 and moves it to a third position 656. Assuming the user is still not satisfied with the snippet at the third position 656, the user grabs the snippet from the third position 656 and moves it to a final position 658. Once the length of the snippet is fixed, a user just moves the window left or right so that the part of the clip that one wants is covered. Depending on an implementation, a user can grab a snippet at the snippet center point 653, or at an end point or at any visible location within the snippet to be moved.

Returning to FIG. 6A at block 609, the first editing process 630 enables the user to select the initial snippet start point 633 of the displayed initial snippet 632 and move the initial snippet start point 633 to the final snippet start point 637. At block 612, the user selects the initial snippet end point 634 of the displayed snippet and moves the initial snippet end point 634 to the final snippet end point 638. At block 615, the desired final snippet 636 is displayed on the user's device. The user device may also play the full snippet to determine whether it is acceptable. In another embodiment, the user would be shown thumbnail previews of the beginning or end of the snippet as the user drags the start and end marks to provide feedback concerning start and end point selection. Dragging may be provided by a user using a mouse or by touch feedback, for example. At block 618, if the user is satisfied with the edited snippet, the snippet editing process ends, such as stopping the first editing process 630 or stopping the second editing process 650. If the user is not satisfied with the edited snippet, the modifying process 600 can be restarted at block 603.

Figure 8:
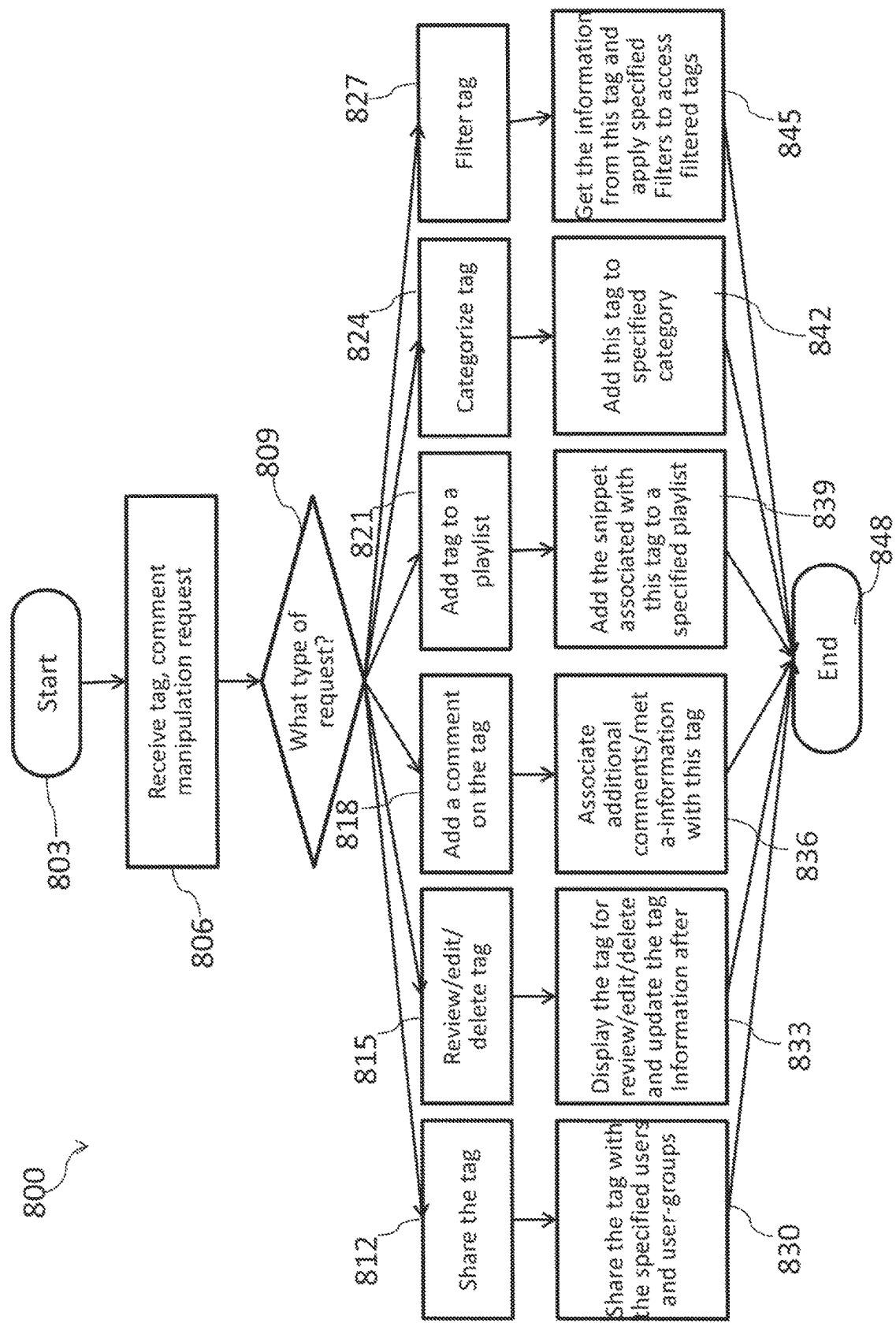
FIG. 8 illustrates a process to share, edit, delete, categorize preexisting tags, add comments to existing tags, add an existing tag to a new/existing playlist, filter tags, and take similar actions on all or a group of the filtered tags in accordance with the present invention.

FIG. 7 illustrates a process 700 to access past tags and comments for multimedia content in accordance with the present invention. At block 703, the process 700 starts. At block 706, a query requests details, including filtering parameters, by displaying the request for such data on the user device. At block 709, the query request is generated based on the details entered by the user, to search for a tag, comments, and other details of multimedia content around a specified time interval. At block 712, the query request is searched in the database and on a match, at block 715, the results are returned to the user device. These tags are then displayed on a display, such as display 143 of FIG. 1E, and as described in connection with FIG. 3 display 300. Some of the tags may be editable by the user who is viewing these tags. If the user selected some tags to be edited then as shown in FIG. 8 process 800 these tags are altered. If the user does not select a tag or tags to be edited, the process 700 ends at block 718.

FIG. 8 illustrates a process 800 to share, edit, delete, categorize preexisting tags, add comments to existing tags, add an existing tag to a new or existing playlist, filter tags, and take similar actions on all or a group of the filtered tags in accordance with the present invention. At block 803, the process 800 starts. At block 806, a request to manipulate a particular tag is received. At block 809, a determination is made regarding the type of request and based on the type of request, appropriate action is taken by selecting the appropriate sub-process. At block 812, a share a tag sub-process is started. At block 830, the tag, comments, and other metadata are shared with specified users and user groups. Also, sharing properties, such as specifying users in user groups, and the like may be changed at block 830. At block 815, a review, edit, delete tag sub-process is started. At block 833, the tag is displayed for review, editing, deletion, and update. At block 833, a tag may be deleted or the comment and hashtags associated with the tags may be modified and then the corresponding changes are made in the database storage. At block 818, an add a comment sub-process is started. For example, at block 836 if another user has a comment on a tag that the present user likes, the new comments may be added on the tag. In the exemplary display 300 of FIG. 3, the user John has created the tag 306 with a comment "#touchdown—great run!". This tag 306 was shared with user abba. When user abba saw this tag 306, abba added a comment to this tag using the workflow process 800. This added comment is shown as "poor defense!" in FIG. 3.

At block 821, an add tag to a playlist sub-process is started. At block 839, a request to add a tag to a playlist is received and processed and then the tag is added to the playlist and if necessary a new playlist may be created. At block 824, a categorize tag sub-process is started. At block 842, all or a selected group of tags are categorized and a new tag may be added to a specified category. Also, at block 842, additional hashtags may be added. At block 827, a filter tag sub-process is started. At block 845, information associated with the tag is retrieved and then appropriate filters are created based on the retrieved information in order to more efficiently access tags in the database. For example, if a request, for example by the filter sub-process at block 827, is received to show tags that are similar to submitted tags, then corresponding filtering iterations are done at block 845 and new tags are displayed at the user device. For example, if the comment is "What a great touchdown" and a user requests to show tags that are similar to this comment, then the comment database can be searched to find comments that contain words "great touchdown". The search results then can be ranked by the same game, team or teams of the games, players in the games, the year of the game, the user who has created this tag and the like.

Figure 9:
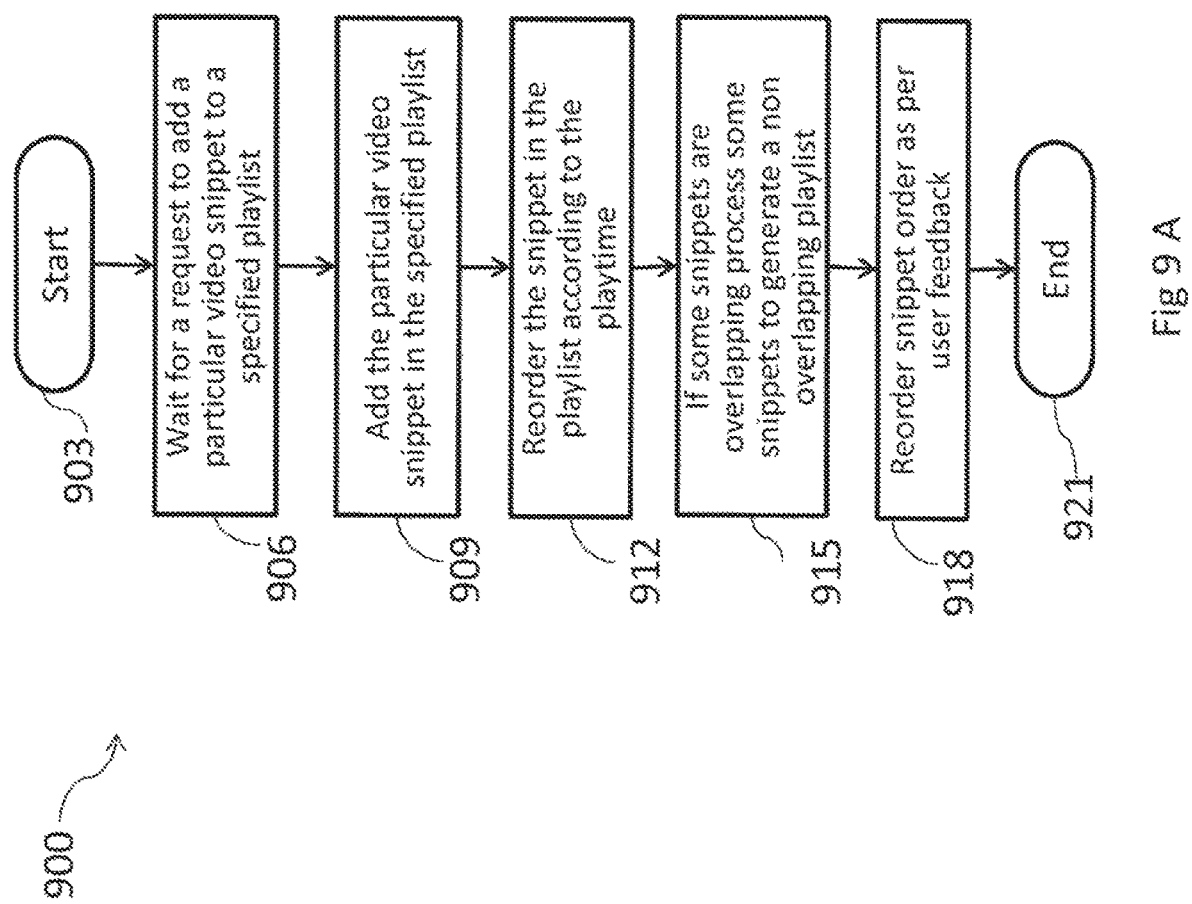
FIG. 9A illustrates a playlist process to manually create a new playlist or modify an old playlist consisting of stored tags in accordance with the present invention.
FIG. 9B illustrates an automatic playlist process to automatically create a new playlist from a specified multimedia program consisting of stored tag data in accordance with the present invention.
FIG. 9C illustrates a graph that displays the snippets for a selected multimedia program and a threshold, such as a specified number of viewers, that is used to automatically select important snippets from all displayed snippets in accordance with the present invention.
Figure 9:
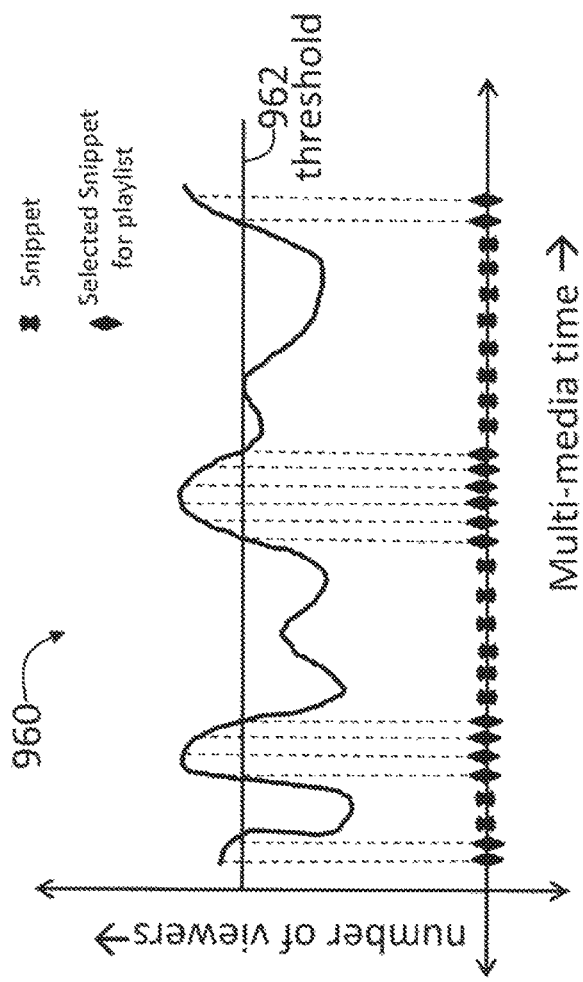
Figure 9:
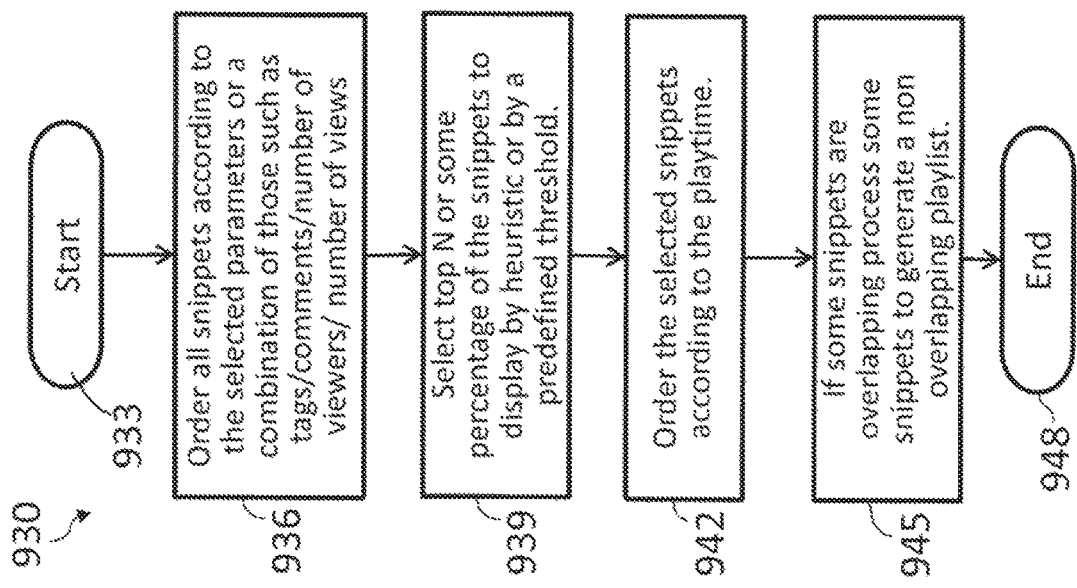

FIG. 9A illustrates a playlist process 900 to manually create a new playlist or modify an old playlist consisting of stored tags in accordance with the present invention. At block 903, the playlist process 900 is started. At block 906, the playlist process 900 waits until a new request to add a particular tag and associated snippet to a playlist is received. At block 909, the requested tag and associated snippet is added to the set of the tags and snippets the playlist holds. At block 912, if the playlist contains tags from a same program then they may need to be reordered at block 912 so that the tags in the playlist are played in order of their start times. At block 915, some tags have snippets which are checked if they are overlapping. If snippets are found to be overlapping, then these snippets are reprocessed to create joint snippets at block 915 so that when the snippets are played no content is duplicated. Tags that are not from the same program are not reordered and left in the order they were received. Also, user may reorder the tags at block 918 in a playlist as the users are allowed to edit the playing order of the snippets. At block 921, the playlist process 900 ends.

Instead of manually generating a playlist, the snippet generation system can automatically generate a playlist for a given multimedia program. FIG. 9B illustrates an automatic playlist process 930 to automatically create a new playlist from a specified multimedia program consisting of stored tag data in accordance with the present invention. At block 933, the automatic playlist process 930 is started. At block 936, using the filtering ability, the snippets from the desired program are selected. Also, at block 936, these snippets are then ordered by utilizing a desired metric. For example, a simple metric to be used might be number of viewers who have seen that snippet. At block 939, the top N of these snippets are selected to be included in a playlist that is automatically generated for this content. At block 942, once the snippets that are to be included into the playlist are finalized, those snippets are ordered by their start times. At block 945, if some snippets are overlapping, then those are combined to form a bigger snippet to remove the duplicate content. At block 945, this playlist is then stored in the storage.

FIG. 9C illustrates a graph 960 that displays the snippets for a selected multimedia program and a threshold 962, such as a specified number of viewers. In accordance with the present invention, that threshold 962 is used to automatically select important snippets for which the number of viewers exceeded the threshold from all displayed snippets. The threshold 962 can be a fixed threshold or a dynamic threshold. A fixed threshold is a threshold which does not change depending on the program, program details, and time, for example. Thus, a fixed threshold does not change as the number of viewers change during repeated playing of the streaming multimedia content. A dynamic threshold is a threshold that may be different for each program depending on program parameters. Two examples of threshold selection are outlined. A fixed threshold can be simply a predetermined number of users. For example, the tagging system can set a rule that multimedia content is considered important wherever the total number of users is >2000. A dynamic threshold can be set up as a percentage of a monitored variable, such as number of viewers. For example, if the maximum number of viewers for the particular show was 10,000, then the tagging system can set a rule that the multimedia content is considered important if the number of viewers is greater than 50% of the maximum number of viewers. Thus, whenever the number of viewers goes beyond 5,000 that multimedia content can be classified as important. In another example of a dynamic threshold, a plurality of snippets may be selected that represents the top N snippets that were viewed by a plurality of viewers, wherein the number N may be changed according to a different variable, such as having a different N for different days of the week when the media content may be replayed. The fixed threshold rule stated in the first example can be applied as the program is being streamed live. However, because the maximum number of users cannot be determined before the program ends, the second threshold which is a dynamic threshold can only be applied retroactively after the program has ended on replays of the program. Other dynamic thresholds can be used in real time. For example, a dynamic threshold may be adjusted according to a number of viewers determined at the current sampling time or determined at preset times during the multimedia program, which number of viewers may increase or decrease as the multimedia program plays.

Figure 10:
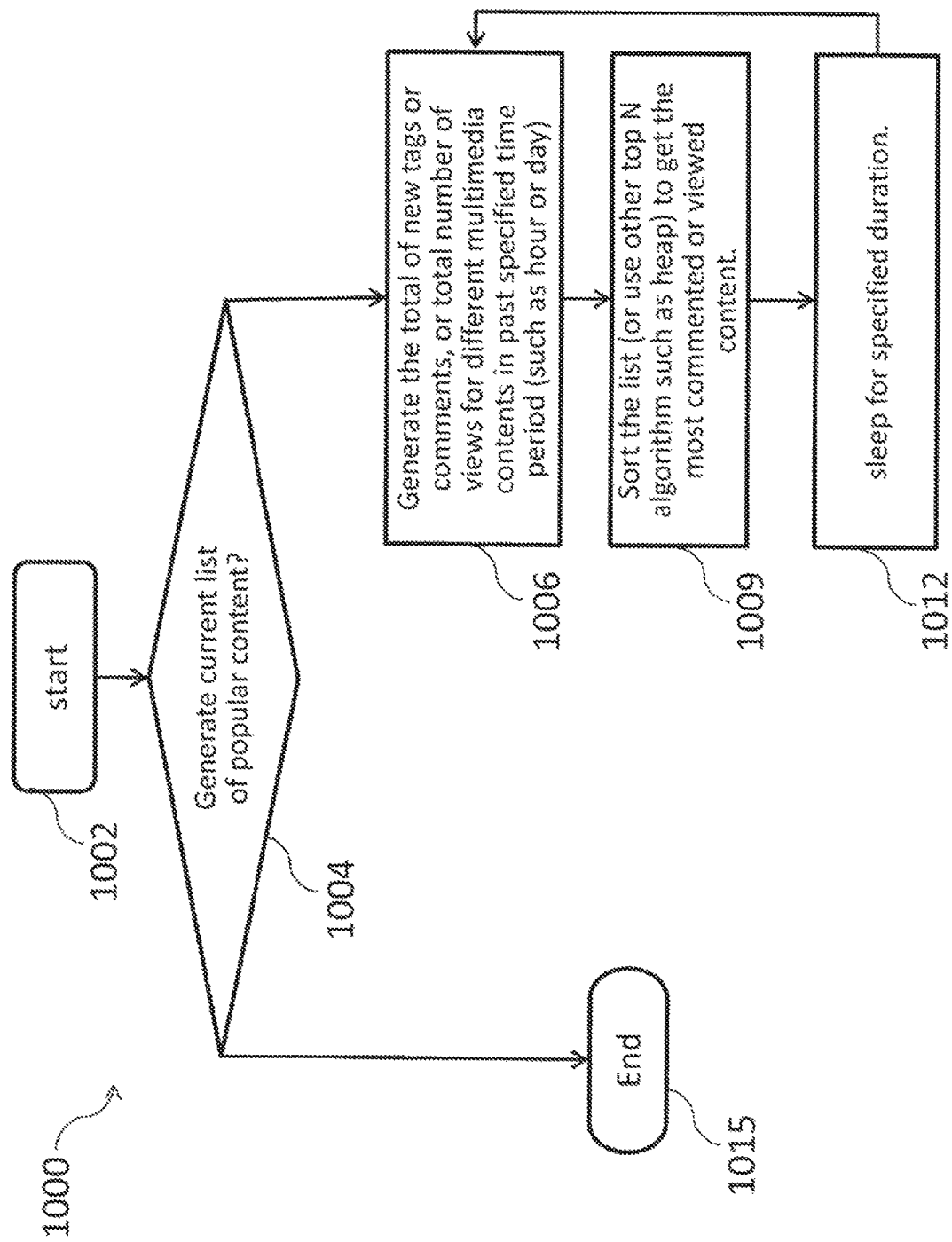
FIG. 10 illustrates a process to automatically determine current popular content in accordance with the present invention.

FIG. 10 illustrates a process 1000 to automatically determine current popular content in accordance with the present invention. At block 1004, a determination is made whether a list of popular content needs to updated. If the list of popular content does not need to be updated, the process 1000 proceeds to block 1015 and ends. If the list of popular content does need to be updated, the process 1000 proceeds to block 1006. At block 1006, various summarization parameters are generated for multimedia content to update the list since the last generation of such results. For example, a total number of tags for different contents, a total number of comments for different contents, and a total number of viewers following different contents may be generated in a listing for multimedia content from stored statistics. At block 1009, the list of the multimedia contents is sorted by a chosen parameter and the top N contents are chosen as the most popular content. At block 1012, the process 1000 pauses, also referred to as sleeps, for a specified duration after which the process 1000 returns to block 1006. Alternatively, the after the specified duration has passed, the process 1000 may return to block 1002 in situations where popular content is not automatically updated.

Those of skill in the art will appreciate from the present disclosure additional, alternative system and method to associated multimedia tags with user comments and user selected multimedia snippets for efficient storage and sharing of tagged items between users, based on television program audio and video content fingerprinting, in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those of ordinary skill in the art may be made in the arrangement, operation and details of the method and apparatus of the present invention disclosed herein without departing from the spirit and scope of the invention.

The invention claimed is:

1. A non-transitory machine-readable storage medium having stored thereon, program instructions that when executed by a processor of a machine, cause the machine to perform operations comprising:
    capturing a snippet of multimedia content from a multimedia program at a timestamp;
    generating a tag representing the snippet of multimedia content, wherein the tag, the timestamp, meta information associated with matching original multimedia content, and a monitored variable for a number of viewers of the snippet of multimedia content are stored in a snippet database as a tagged snippet of multimedia content;
    performing a comparison the tagged snippet of multimedia content at a selected insertion point in a playlist of tags with other snippets in the playlist of tags if the number of viewers of the tagged snippet exceeds a threshold to automatically determine whether there is an overlap between the tagged snippet and the other snippets;
    determining, based on the comparison, that there is the overlap between the tagged snippet and the other snippets; and
    responsive to determining that there is the overlap, automatically removing duplicate content from the tagged snippet determined to have the overlap between the tagged snippet and the other snippets to create a modified snippet with an adjusted size without the overlap for insertion in the playlist of tags.

2. The non-transitory machine-readable storage medium of claim 1, wherein the operations further comprise: moving an initial start point to a final start point for the overlap determined at a beginning of the snippet.

3. The non-transitory machine-readable storage medium of claim 1, wherein the operations further comprise: moving the modified snippet to a new position in the playlist of tags, to generate a modified playlist of tags.

4. The non-transitory machine-readable storage medium of claim 1, wherein the operations further comprise: moving an initial stop point to a final stop point for the overlap determined at an end of the snippet.

5. The non-transitory machine-readable storage medium of claim 1, wherein capturing the snippet of multimedia content from the multimedia program at the timestamp comprises selectively capturing, using a mobile device, the snippet of multimedia content from the multimedia program at the timestamp.

6. A non-transitory machine-readable storage medium having stored thereon, program instructions that when executed by a processor of a machine, cause the machine to perform operations comprising:
    receiving multimedia content;
    generating, according to a specified parameter, a first plurality of snippets from the multimedia content;
    selecting, according to a predefined threshold, a second plurality of snippets from the first plurality of snippets;
    ordering, in an ordered playlist, the second plurality of snippets according to a start time of each snippet of the second plurality of snippets in the ordered playlist; and
    processing snippets from the ordered playlist that are overlapping to automatically remove duplication of multimedia content from the ordered playlist and generate a final playlist with non-overlapping snippets.

7. The non-transitory machine-readable storage medium of claim 6, wherein the operations further comprise:
    adding a new user selected snippet to the final playlist to create a modified playlist;
    reordering the modified playlist according to a start time of each snippet in the reordered modified playlist; and
    processing the snippets from the reordered modified playlist that are overlapping to remove duplication of multimedia content from the reordered modified playlist.

8. The non-transitory machine-readable storage medium of claim 6, wherein the specified parameter is a classification of the multimedia content.

9. The non-transitory machine-readable storage medium of claim 6, wherein the predefined threshold represents a specified number of viewers of the multimedia content.

10. The non-transitory machine-readable storage medium of claim 6, wherein the predefined threshold is a fixed threshold that does not change as a number of viewers changes during repeated playing of the multimedia content.

11. The non-transitory machine-readable storage medium of claim 6, wherein the predefined threshold is a dynamic threshold that is a percentage of a number of viewers, and wherein the dynamic threshold changes as the number of viewers change during repeated playing of the multimedia content.

12. The non-transitory machine-readable storage medium of claim 6, wherein the second plurality of snippets represents a quantity of snippets that were most-viewed by a plurality of viewers.

13. The non-transitory machine-readable storage medium of claim 6, wherein the specified parameter is a time measure representing a duration of playing a snippet.

14. The non-transitory machine-readable storage medium of claim 6, wherein the specified parameter is an indication of a user request to generate one or more snippets.

15. The non-transitory machine-readable storage medium of claim 6, wherein the operations further comprise: identifying each snippet of the first plurality of snippets from a successful match of fingerprints based on features detected from a scale space analysis of frames in the snippet compared with original fingerprints of original multimedia content stored by the machine.

16. A system comprising:
    a memory that stores instructions; and
    one or more processors configured by the instructions to perform operations comprising:
        capturing a snippet of multimedia content from a multimedia program at a timestamp;
        generating a tag representing the snippet of multimedia content, wherein the tag, the timestamp, meta information associated with matching original multimedia content, and a monitored variable for a number of viewers of the snippet of multimedia content are stored in a snippet database as a tagged snippet of multimedia content;
        performing a comparison the tagged snippet of multimedia content at a selected insertion point in a playlist of tags with other snippets in the playlist of tags if the number of viewers of the tagged snippet exceeds a threshold to automatically determine whether there is an overlap between the tagged snippet and the other snippets;

determining, based on the comparison, that there is the overlap between the tagged snippet and the other snippets; and responsive to determining that there is the overlap, automatically removing duplicate content from the tagged snippet determined to have the overlap between the tagged snippet and the other snippets to create a modified snippet with an adjusted size without the overlap for insertion in the playlist of tags.

17. The system of claim 16, wherein the operations further comprise: moving an initial start point to a final start point for the overlap determined at a beginning of the snippet.

18. The system of claim 16, wherein the operations further comprise: moving the modified snippet to a new position in the playlist of tags, to generate a modified playlist of tags.

19. The system of claim 16, wherein the operations further comprise: moving an initial stop point to a final stop point for the overlap determined at an end of the snippet.

20. The system of claim 16, wherein capturing the snippet of multimedia content from the multimedia program at the timestamp comprises selectively capturing, using a mobile device, the snippet of multimedia content from the multimedia program at the timestamp.

\* \* \* \* \*